US012654330B2

(12) United States Patent
Nakamura

(10) Patent No.: US 12,654,330 B2
(45) Date of Patent: Jun. 16, 2026

(54) ROBOT CONTROL SYSTEM, ROBOT CONTROL METHOD, AND PROGRAM

(71) Applicant: HITACHI, LTD., Tokyo (JP)

(72) Inventor: Satoshi Nakamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 320 days.

(21) Appl. No.: 18/033,814

(22) PCT Filed: Aug. 26, 2021

(86) PCT No.: PCT/JP2021/031322
§ 371 (c)(1),
(2) Date: Apr. 26, 2023

(87) PCT Pub. No.: WO2022/102207
PCT Pub. Date: May 19, 2022

(65) Prior Publication Data
US 2023/0390935 A1 Dec. 7, 2023

(30) Foreign Application Priority Data
Nov. 10, 2020 (JP) ................................. 2020-186988

(51) Int. Cl.
*B25J 9/16* (2006.01)
(52) U.S. Cl.
CPC ........... *B25J 9/1697* (2013.01); *B25J 9/1664* (2013.01)
(58) Field of Classification Search
CPC ........ B25J 9/1697; B25J 9/1664; B25J 9/163; B25J 13/00; G05B 2219/37555; G05B 2219/40053
See application file for complete search history.

(56) References Cited

U.S. PATENT DOCUMENTS 10,549,928 B1 * 2/2020 Chavez ................ B65G 47/905
10,706,331 B2 7/2020 Shibata et al.
(Continued)

FOREIGN PATENT DOCUMENTS

JP 2006-320997 A 11/2006
JP 2018-136211 A 8/2018
(Continued)

OTHER PUBLICATIONS

International Search Report of PCT/JP2021/031322 dated Nov. 22, 2021.
(Continued)

*Primary Examiner* — Sihar A Karwan
(74) *Attorney, Agent, or Firm* — MATTINGLY & MALUR, PC

(57) ABSTRACT

This robot control system is provided with a robot device, an environment sensor which acquires an environmental condition of the robot device, and a control device which controls the operation of the robot device by employing a trained model to generate an operation command for the robot device, corresponding to the current output of the environment sensor, wherein the control device is provided with: an environmental condition matching degree calculating unit which calculates a degree of matching between the environmental condition of the robot device during learning and the current environmental condition of the robot device, on the basis of the current output of the environment sensor; and an adjusting unit which adjusts the content of the robot device operation command on the basis of the calculation result of the degree of matching.

9 Claims, 12 Drawing Sheets

(56) References Cited

U.S. PATENT DOCUMENTS

| | | | | |
|---|---|---|---|---|
| 10,754,318 | B2 * | 8/2020 | Nagarajan | B25J 9/161 |
| 10,792,810 | B1 * | 10/2020 | Beckman | B25J 9/163 |
| 10,906,188 | B1 * | 2/2021 | Sun | B25J 9/1671 |
| 10,919,151 | B1 * | 2/2021 | Marchese | B65G 1/1373 |
| 10,958,895 | B1 * | 3/2021 | Krishnan Gorumkonda | |
| | | | | H04N 13/246 |
| 11,148,289 | B1 * | 10/2021 | Brady | B25J 13/085 |
| 11,440,196 | B1 * | 9/2022 | Kirmani | G06N 3/045 |
| 11,529,743 | B2 * | 12/2022 | Komoda | B25J 17/02 |
| 11,628,566 | B2 * | 4/2023 | Johnson | B25J 9/161 |
| | | | | 700/245 |
| 11,731,271 | B2 * | 8/2023 | Wake | G06V 40/107 |
| | | | | 700/253 |
| 11,780,095 | B2 * | 10/2023 | Yamazaki | B25J 9/1612 |
| | | | | 700/259 |
| 11,845,194 | B2 * | 12/2023 | Yamazaki | B25J 15/08 |
| 12,115,677 | B2 * | 10/2024 | Schneider | B25J 9/1697 |
| 2010/0092032 | A1 * | 4/2010 | Boca | B25J 9/1697 |
| | | | | 348/222.1 |
| 2012/0022691 | A1 * | 1/2012 | Owens, Jr. | B25J 9/1687 |
| | | | | 700/259 |
| 2015/0314440 | A1 * | 11/2015 | Parker | B25J 9/1612 |
| | | | | 700/253 |
| 2016/0016311 | A1 * | 1/2016 | Konolige | B25J 9/1664 |
| | | | | 901/30 |
| 2016/0059412 | A1 * | 3/2016 | Oleynik | B25J 19/02 |
| | | | | 700/250 |
| 2016/0167228 | A1 * | 6/2016 | Wellman | B25J 9/1602 |
| | | | | 901/3 |
| 2017/0136632 | A1 * | 5/2017 | Wagner | B07C 3/18 |
| 2017/0225330 | A1 * | 8/2017 | Wagner | B25J 9/1664 |
| 2017/0252924 | A1 * | 9/2017 | Vijayanarasimhan | G06N 3/08 |
| 2017/0320210 | A1 * | 11/2017 | Ding | B25J 9/1661 |
| 2018/0169858 | A1 * | 6/2018 | Jain | B65G 1/1375 |
| 2018/0330200 | A1 * | 11/2018 | Shibata | G06F 18/241 |
| 2019/0084151 | A1 * | 3/2019 | Bai | B25J 9/1697 |
| 2019/0126487 | A1 * | 5/2019 | Benaim | B25J 9/163 |
| 2019/0261565 | A1 * | 8/2019 | Robertson | G06F 18/24323 |
| 2019/0275671 | A1 * | 9/2019 | Natarajan | B25J 9/1664 |
| 2019/0291277 | A1 * | 9/2019 | Oleynik | B25J 9/1669 |
| 2019/0291282 | A1 * | 9/2019 | Marchese | B25J 9/1669 |
| 2019/0361672 | A1 * | 11/2019 | Odhner | B25J 9/1679 |
| 2020/0095001 | A1 * | 3/2020 | Menon | B25J 9/0093 |
| 2020/0122321 | A1 * | 4/2020 | Khansari Zadeh | B25J 9/1664 |
| 2020/0164517 | A1 * | 5/2020 | Dick | G06N 3/006 |
| 2020/0198130 | A1 * | 6/2020 | Goldberg | B25J 9/1697 |
| 2020/0269429 | A1 * | 8/2020 | Chavez | B25J 15/0616 |
| 2020/0361083 | A1 * | 11/2020 | Mousavian | G06N 3/063 |
| 2020/0394747 | A1 * | 12/2020 | Chatterjee | G06T 7/70 |
| 2021/0053216 | A1 * | 2/2021 | Diankov | B25J 9/1669 |
| 2021/0053221 | A1 * | 2/2021 | Jagannath | G06N 3/08 |
| 2021/0053230 | A1 * | 2/2021 | Mizoguchi | B25J 19/023 |
| 2021/0069898 | A1 * | 3/2021 | Duan | B25J 9/161 |
| 2021/0069903 | A1 * | 3/2021 | Duan | G06N 3/08 |
| 2021/0069904 | A1 * | 3/2021 | Duan | B25J 9/1697 |
| 2021/0069908 | A1 * | 3/2021 | Rohaninejad | B25J 9/161 |
| 2021/0081791 | A1 * | 3/2021 | Goodrich | G06T 7/73 |
| 2021/0122039 | A1 * | 4/2021 | Su | B25J 9/163 |
| 2021/0122043 | A1 * | 4/2021 | Menon | B25J 9/1679 |
| 2021/0122053 | A1 * | 4/2021 | Hallock | H04N 23/54 |
| 2021/0125052 | A1 * | 4/2021 | Tremblay | G06N 3/08 |
| 2021/0138655 | A1 * | 5/2021 | Mousavian | B25J 9/1666 |
| 2021/0146531 | A1 * | 5/2021 | Tremblay | G06N 3/006 |
| 2021/0181716 | A1 * | 6/2021 | Quinlan | G06V 10/40 |
| 2021/0188554 | A1 * | 6/2021 | Kalouche | B07C 3/08 |
| 2021/0311082 | A1 * | 10/2021 | Tesluk | G01N 35/1011 |
| 2021/0323145 | A1 * | 10/2021 | Hayashi | G06F 9/451 |
| 2021/0334551 | A1 * | 10/2021 | Ando | G06T 7/0002 |
| 2022/0072707 | A1 * | 3/2022 | Fan | G06T 7/73 |
| 2022/0080584 | A1 * | 3/2022 | Wicks | B25J 19/021 |

FOREIGN PATENT DOCUMENTS

| | | |
|---|---|---|
| JP | 2018-190241 A | 11/2018 |
| JP | 2019-136807 A | 8/2019 |
| JP | 2020-110894 A | 7/2020 |

OTHER PUBLICATIONS

Written Opinion of the International Search Authority of PCT/JP2021/031322 dated Nov. 22, 2021.

* cited by examiner

ROBOT CONTROL SYSTEM, ROBOT CONTROL METHOD, AND PROGRAM

TECHNICAL FIELD

The present invention relates to a robot control system, a robot control method, and a program.

BACKGROUND ART

Conventionally, a robot device represented by an industrial robot repeatedly performs an operation only with respect to a stored position of a workpiece, and thus, programming for specifying a position according to work content is required in order to cause the robot device to execute work. However, there is a case where it is difficult for the robot device to cope with a positional deviation of the workpiece or a change in the work content. In this regard, a technique for controlling the robot device to execute predetermined work using a machine learning technique including a neural network has been known. This technique uses a learning unit (trained model) which has been subjected to machine learning so as to generate an operation command of the robot device from information of an environment sensor, such as a camera, in a plurality of work scenes in which positions of workpieces or the like are different. Then, the robot device can be caused to execute the work even in different work scenes by controlling the robot device using the operation command generated by inputting an output of the environment sensor to the machine-learned learning unit.

For example, PTL 1 discloses a system that executes a predetermined task using a learning module including a trained model or a model equivalent thereto. In the system described in PTL 1, a predictor configured using a trained model outputs a gripping success rate and a constraint satisfaction level based on a plurality of operation candidates, an image captured by a camera, and an orientation of a robot, and an operation determination unit calculates an evaluation value based on the gripping success rate and the constraint satisfaction level and determines a next operation from among the operation candidates based on the evaluation value. The gripping success rate is a probability of success when each of the operation candidates is performed. The constraint satisfaction level indicates whether a constraint condition specified by a user is satisfied. According to this system, the operation of the robot can be determined based on the image captured by the camera, the operation can be adjusted according to an input, such as the constraint condition, from the user, and the robot can be caused to execute work in some work scenes.

CITATION LIST

Patent Literature

PTL 1: JP 2018-190241 A

SUMMARY OF INVENTION

Technical Problem

Meanwhile, the learning unit (trained model) which has been subjected to machine learning is basically an approximate inference device based on statistics, and can perform inference with high accuracy in a case where there is an input in a situation close to a situation where the learning unit has been subjected to the machine learning, but the inference accuracy of the learning unit decreases in a case where there is an input in a situation different from the time where the learning unit has been subjected to the machine learning.

In the system described in PTL 1, it is sometimes difficult to cause the robot device to appropriately operate under an environmental condition that affects the image captured by the camera, such as luminance around a workpiece being different from luminance at the time of learning by the learning unit. Further, in a case where the operation is adjusted according to the input of the constraint condition from the user, it is necessary for the user to correctly recognize a change in the environment and correctly convert the recognized content into the constraint condition. However, it is sometimes difficult for the user to specify the constraint condition with high accuracy so that it is difficult to cause the robot device to appropriately operate.

The present invention has been made in view of the above circumstances, and an object thereof is to enable a robot device using a learning unit to appropriately execute work when detecting that a current environmental condition of the robot device is different from an environmental condition when the learning unit has been subjected to machine learning.

Solution to Problem

In order to solve the above problem, a robot control system according to one aspect of the present invention is a robot control system including: a robot device; an environment sensor that acquires an environmental condition of the robot device; and a control device that inputs a current output of the environment sensor to a trained model, obtained by machine learning for generation of an operation command of the robot device corresponding to an output of the environment sensor, to generate an operation command of the robot device corresponding to the current output of the environment sensor output from the trained model, and controls an operation of the robot device.

The control device includes: an environmental condition matching degree calculation unit that calculates a matching degree between an environmental condition of the robot device when the trained model has machine-learned the operation command of the robot device and a current environmental condition of the robot device based on the current output of the environment sensor; and an adjustment unit that adjusts a content of the operation command of the robot device and/or a setting of the environment sensor based on a calculation result of the environmental condition matching degree calculation unit.

Advantageous Effects of Invention

According to at least one aspect of the present invention, when it is detected that the current environmental condition of the robot device using a learning unit is different from the environmental condition at the time of the machine learning by the learning unit, the content of the operation command of the robot device and/or the setting of the environment sensor are adjusted based on the matching degree between the current environmental condition and the environmental condition at the time of the learning. Therefore, the robot device can appropriately execute the work according to the operation command of the robot device and/or the setting of the environment sensor adjusted as described above.

Other objects, configurations, and effects which have not been described above become apparent from embodiments to be described hereinafter.

DESCRIPTION OF EMBODIMENTS

Hereinafter, examples of modes for carrying out the present invention will be described with reference to the accompanying drawings. In the present specification and attached drawings, constituent elements having substantially the same function or configuration will be denoted by the same reference sign, and the redundant description thereof will be omitted.

First Embodiment

First, a configuration of a robot device according to a first embodiment of the present invention and a configuration of a robot control system that controls the robot device will be described with reference to FIGS. 1 and 2.

Overall Configuration of Robot Control System

Figure 1:
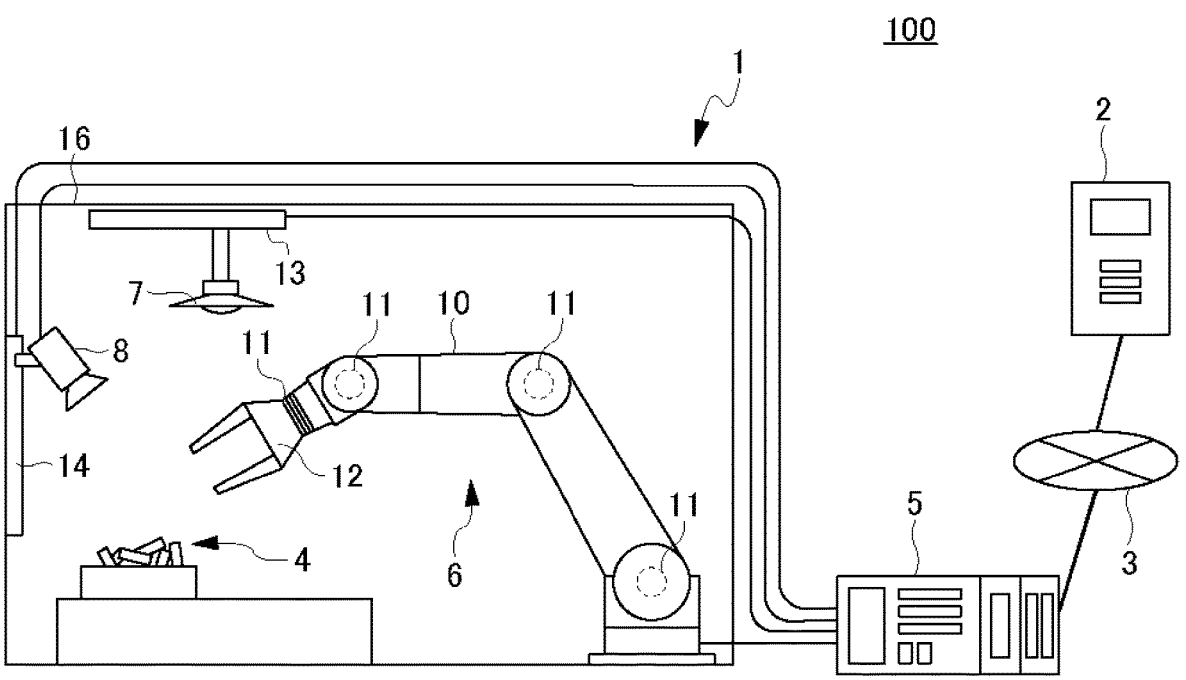
FIG. 1 is a schematic diagram illustrating an example of an overall configuration of a robot control system according to a first embodiment of the present invention.

FIG. 1 is a schematic diagram illustrating an example of an overall configuration of the robot control system according to the first embodiment. In a robot control system 100, a robot control device 5 connected to each unit of a robot device 1 is connected to a learning type control device 2 to be capable of communicating via a network 3 such as the Internet or a LAN. Note that the robot device 1 is an object to be controlled by the robot control system 100, and the robot control system 100 does not necessarily include the robot device 1.

The robot device 1 executes instructed work on a workpiece 4. The robot device 1 includes a working robot 6 (robot body), a lighting device 7, a lighting device moving mechanism 13 that changes a position of the lighting device 7, a camera 8, and a camera moving mechanism 14 that changes a position of the camera 8. These elements constituting the robot device 1 are accommodated in a transparent cover body 16. The cover body 16 is not essential. The lighting device 7, the lighting device moving mechanism 13, the camera 8, and the camera moving mechanism 14 are peripheral devices of the working robot 6. The camera 8 has a function of obtaining an image signal of an optical image including the workpiece 4 handled by the robot device 1. The camera 8 is also an environment sensor that measures a work environment (environmental condition) of the robot device 1. In the present specification, the working robot 6 and the peripheral devices are described as the "robot device" in the case of not being distinguished from each other or being collectively referred to.

The working robot 6 includes a robot arm 10 and an end effector 12 attached to a distal end of the robot arm 10. The robot arm 10 has a plurality of joints, and can freely operate by driving an actuator, such as a motor (not illustrated), provided in each of the joints. An angle meter 11 is attached to each of the joints of the robot arm 10. The working robot 6 is configured to be capable of calculating a position of the end effector 12 by calculating an orientation of the robot arm 10. Although an example of a vertical articulated robot is illustrated in the present embodiment, an orthogonal coordinate robot, a horizontal articulated robot, a parallel link robot, or the like may be used.

The working robot 6, the lighting device 7, the lighting device moving mechanism 13, the camera 8, and the camera moving mechanism 14 of the robot device 1 are connected to the robot control device 5. The working robot 6 and the respective peripheral devices operate in response to a control command (a motor current of the working robot 6, a voltage applied to the lighting device 7, a control signal of the camera 8, or the like) from the robot control device 5, and transmit information indicating a state of the robot device 1 to the robot control device 5.

Examples of the information indicating the state of the robot device 1 include a joint angle of the working robot 6, luminance of illumination light of the lighting device 7, a position of the lighting device 7 obtained by the lighting device moving mechanism 13, an image (camera image) captured by the camera 8, a position of the camera 8 obtained by the camera moving mechanism 14, and the like.

The luminance of the illumination light of the lighting device 7 is represented using, for example, a light flux (lumen). When the light flux of the illumination light of the lighting device 7 changes, the illuminance inside the robot device 1 or around the robot device 1 changes, and this change appears in brightness and saturation of the camera image. The joint angle of the working robot 6 is an angle formed by elements (a base, an arm, a hand, and the like) connected by each of the joints. Hereinafter, the information indicating the state of the robot device 1 may be simply referred to as the "state of the robot device 1".

The robot control device 5 is connected to the learning type control device 2 via the network 3. The robot control device 5 transmits the information indicating the state of the robot device 1 obtained from the robot device 1 to the learning type control device 2 via the network 3. The robot control device 5 calculates a control command for the robot device 1 based on an operation command (a target joint angle of the working robot 6, a target light flux of the lighting device 7, or the like) output from the learning type control device 2 and the state of the robot device 1 input from the robot device 1.

Here, an operation principle of the working robot 6 will be described.

The learning type control device 2 outputs the target joint angle of each of the joints of the working robot 6 to the robot control device 5 as the operation command such that the end effector 12 moves to a desired position. With respect to the target joint angle received from the learning type control device 2, the robot control device 5 outputs the motor current of the working robot 6 as the control command such that an angle of each of the joints coincides with the target joint angle based on the angle information of the angle meter 11 received from the working robot 6.

Note that the operation command output by the learning type control device 2 is not limited to the target angle of each of the joints, and may be, for example, X, Y, and Z positions of the end effector 12 and position and orientation information represented by yaw, pitch, and roll angles. In this case, the robot control device 5 may be configured to internally calculate a solution of inverse kinematics of the working robot 6 and output the motor current of the working robot 6 as the control command.

Hardware Configuration of Robot Control System

Figure 2:
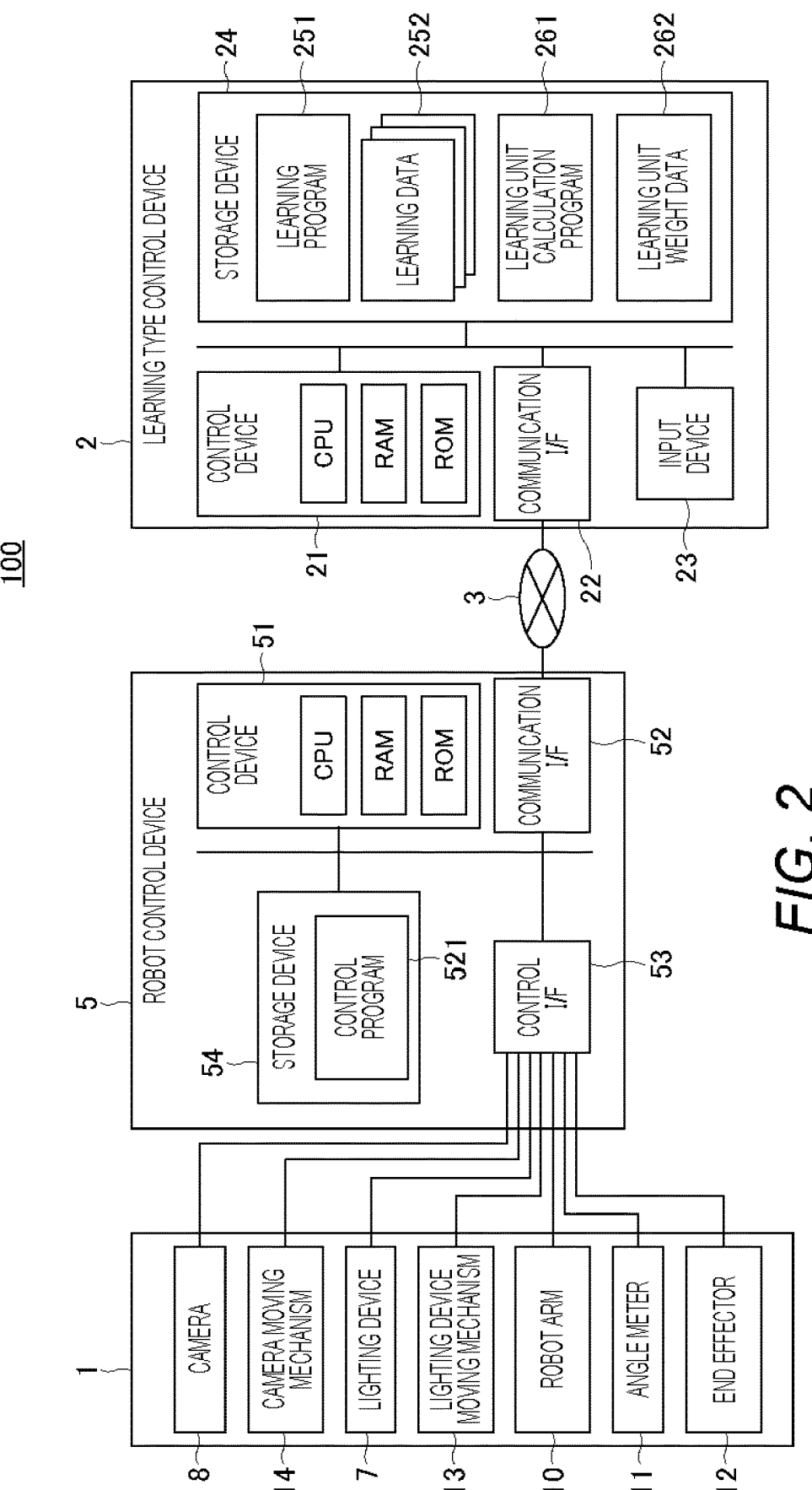
FIG. 2 is a schematic diagram illustrating an example of a hardware configuration for executing software of the robot control system according to the first embodiment of the present invention.

FIG. 2 is a schematic diagram illustrating an example of a hardware configuration configured to execute software of the robot control system 100. In FIG. 2, an interface is described as an "I/F".

Robot Control Device

The robot control device 5 is a computer in which a control device 51, a communication interface 52, a control interface 53, and a storage device 54 are electrically connected to each other via a system bus. The control device 51 includes a central processing unit (CPU), a random access memory (RAM), a read only memory (ROM), and the like, and is configured to execute information processing based on a program and various types of data for implementing functions according to the present embodiment. Instead of the CPU, another processing unit such as a micro processing unit (MPU) may be used.

The communication interface 52 is an interface that is connected to the learning type control device 2 and transmits and receives an operation command to the robot device 1 and data related to a state of the robot device 1. The communication interface 52 communicates with the communication interface 22 of the learning type control device 2 via the network 3.

The control interface 53 is an interface that is connected to the robot device 1 to transmit a control command to the robot device 1 and receive data related to the state of the robot device 1, and is appropriately configured in accordance with devices constituting the robot device 1. Since the configuration of the robot device 1 connected to the control interface 53 has been described with reference to FIG. 1, the description thereof is omitted here.

The storage device 54 is an auxiliary storage device such as a hard disk drive or a semiconductor memory, and stores a control program 521 and the like executed by the control device 51. The ROM and the storage device 54 permanently record programs, data, and the like necessary for the operation of the CPU of the control device 51, and are used as examples of a computer-readable non-transitory recording medium storing the programs to be executed by the CPU. When being activated by turning on the power or the like, the robot control device 5 develops the control program 521, stored in the storage device 54, in the RAM of the control device 51 to execute the control program.

The control program 521 generates the control command for the robot device 1 based on the operation command generated by the learning type control device 2 and/or a setting of the camera 8 input from the communication interface 52, and the information indicating the state of the robot device 1 input from the control interface 53. Then, the control program 521 outputs the control command from the control interface 53 to the robot device 1. Further, the control program 521 outputs the information indicating the state of the robot device 1, input from the control interface 53, from the communication interface 52 to the learning type control device 2.

Learning Type Control Device

The learning type control device 2 is a computer in which a control device 21, the communication interface 22, an input device 23, and a storage device 24 are electrically connected to each other via a system bus. The control device 21 includes a CPU, a RAM, a ROM, and the like, and is configured to execute information processing based on programs and various types of data that implement the functions according to the present embodiment.

The communication interface 22 is an interface that is connected to the robot control device 5 and transmits an operation command of the robot device 1 to the robot control device 5 and receives a state of the robot device 1 from the robot control device 5. The communication interface 22 communicates with the communication interface 52 of the robot control device 5 via the network 3.

The input device 23 is a device that receives the input from the user, such as a mouse or a keyboard, and controls execution of the program and the like of the learning type control device 2.

The storage device 24 is an auxiliary storage device, such as a hard disk drive or a semiconductor memory, and stores a learning program 251 to be executed by the control device 21, a learning unit calculation program 261, learning data 252, learning unit weight data 262, and the like. The ROM and the storage device 24 permanently record programs, data, and the like necessary for the operation of the CPU of the control device 21, and are used as examples of a computer-readable non-transitory recording medium storing the programs to be executed by the CPU. When being activated by turning on the power or the like, the learning type control device 2 develops the learning program 251 and the learning unit calculation program 261, which are stored in the storage device 24, in the RAM of the control device 21.

When the user instructs execution of learning via the input device 23, the learning program 251 generates the learning data 252 using information on the state, environment, and the like of the robot device 1 input from the communication interface 22 and records the generated learning data 252 in the storage device 24. Then, the learning program 251 subjects a learning unit 256 (see FIG. 4), which will be described later, to machine learning using the learning data 252 to generate the learning unit weight data 262 as a learned parameter. The learning unit 256 is a so-called supervised learning model. For example, the learning unit weight data 262 is a weight of a neural network.

When the user instructs execution of control of the robot device 1 via the input device 23, the learning unit calculation program 261 reads the learning unit weight data 262. Then, the learning unit calculation program 261 calculates an operation command of the robot device 1 and a setting of the camera 8 using the state of the robot device 1 obtained from the communication interface 22 and a trained learning unit 264 (see FIG. 7) to be described later. The learning unit 264 is a trained model (inference program) reflecting a result of the learning (learned parameter) of the learning unit 256. The learning unit calculation program 261 outputs the generated operation command of the robot device 1 and setting of the camera 8 from the communication interface 22 to the robot control device 5. The robot control device 5 outputs a control command to the robot device 1 based on the operation command of the robot device 1 input from the learning type control device 2 and/or the setting of the camera 8 to control the operation.

Note that the robot control device 5 and the learning type control device 2 are not limited to the configuration of being connected via the network 3. The robot control device 5 and the learning type control device 2 may have a configuration in which the communication interface 52 and the communication interface 22 are directly connected by a dedicated line or the like. Further, the control interface 53 and the communication interface 52 may be the same, and the robot control device 5 may be configured to output the control command to the robot device 1 via the network 3.

Further, the learning program 251 and the learning unit calculation program 261 are not necessarily stored in the same learning type control device 2, and may be stored in different learning type control devices. For example, it may be configured to perform communication for the learning data 252 and the learning unit weight data 262 between different learning type control devices via the network 3.

Further, the learning type control device 2 and the robot control device 5 may be configured using the same hardware. That is, the control program 521, the learning program 251, and the learning unit calculation program 261 may be configured to be executed on the same hardware.

Next, a method for adjusting an operation command of the robot device 1 based on a comparison between an environmental condition when the learning type control device 2 learns the operation command of the robot device 1 and a current output (environmental condition) of the environment sensor in the robot control system 100 will be described with reference to FIGS. 3 to 8.

Example of Work Executed by Robot Device

Figure 3:
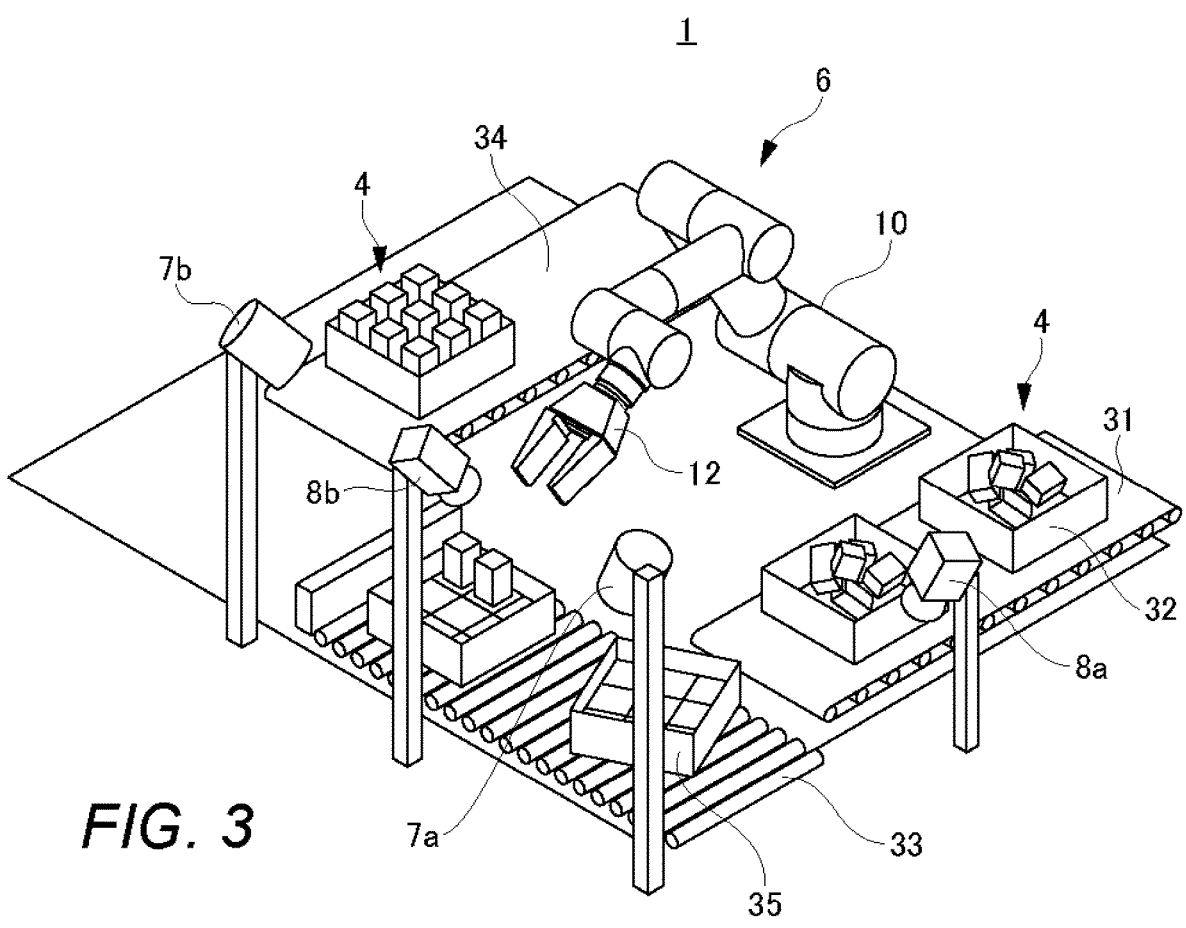
FIG. 3 is an external view illustrating an example of work of the robot device.

FIG. 3 is an external view illustrating an example of work executed by the robot device 1. The example of work of the robot device 1 will be described with reference to FIG. 3.

The working robot 6 is particularly useful for a process of repeatedly executing predetermined work. For example, FIG. 3 illustrates a process in which the working robot 6 repeats work of transferring the workpieces 4 stacked in bulk on a loading tray 32 to an unloading tray 35. The working robot 6 grasps the workpieces 4 loaded in bulk on the loading tray 32 loaded from a loading line 31 one by one with the end effector 12, and aligns arranges the workpieces 4 on the unloading tray 35 loaded from an unloading tray line 33. Then, the working robot 6 grips and moves the unloading tray 35 on which the workpieces 4 are arranged to an unloading line 34. The working robot 6 repeatedly executes these series of work.

In an operation in which the working robot 6 grips and moves the workpiece 4 out of the loading tray 32, it is necessary to control the working robot 6 such that the working robot 6 selects only one workpiece 4 that can be gripped from among a plurality of the workpieces 4, which are randomly arranged, and grips only the selected workpiece 4. It is difficult to cope with such an operation only by specifying a predetermined position of the end effector 12. In this regard, machine learning is performed for the operation of gripping the workpieces 4 stacked in bulk in a plurality of work scenes with changed positions and directions (orientations) of the workpiece 4, and the working robot 6 is controlled using an operation command of the working robot 6 generated by the learning type control device 2 which has been subjected to the machine learning. As a result, it is expected that the working robot 6 can reliably grip the workpiece 4 with the end effector 12 even if the arrangement (position and orientation) of the workpiece 4 is random.

Further, the unloading tray 35 of the unloading tray line 33 is sometimes loaded with a shifted position or direction of the unloading tray 35 as illustrated in FIG. 3. Therefore, the workpiece 4 needs to be arranged in accordance with a position and a direction of the unloading tray 35 when the workpiece 4 is arranged on the unloading tray 35. It is difficult to cope with such an operation only by specifying a predetermined position of the end effector 12. In this regard, in the robot control system 100, machine learning is performed for an operation of arranging the workpieces 4 on the unloading tray 35 in a plurality of work scenes with changed positions and orientations of the unloading tray 35, and the working robot 6 is controlled using an operation command of the working robot 6 inferred by the machine-learned learning unit. As a result, it can be expected that the workpieces 4 are appropriately aligned and arranged on the unloading tray 35 even when the unloading tray 35 is loaded with a shifted position or direction.

In order to execute the control using the machine-learned learning unit as described above, a camera 8a configured to grip states of the workpieces 4 stacked in bulk on the loading tray 32 and a camera 8b configured to grip the position and the direction of the unloading tray 35 may be installed. Further, lighting devices 7a and 7b configured to adjust light and shade of images acquired from the cameras 8a and 8b may be installed. At this time, states (for example, brightness, saturation, and the like) of images acquired from the cameras 8a and 8b at a certain point in time are sometimes not the same as states of images acquired from the cameras 8a and 8b at the time of the machine learning by the learning unit due to an influence of the surrounding environment of the robot device 1 (not illustrated).

For example, there are an influence of light externally shed through a window near the robot device 1, an influence of a lighting provided on a ceiling of a building where the robot device 1 is installed, and the like. These influences change depending on a site, and thus, when the same process is executed at different sites, appropriate control is sometimes not executable because an environmental condition when the learning unit has been subjected to the machine learning is different from a current environmental condition. Therefore, in order to enable the execution of appropriate control on the working robot 6, it is desirable to set an environmental condition at the time of controlling the robot device 1 to be the same as the environmental condition when the learning unit has been subjected to the machine learning.

Method for Learning Operation Command

Next, a method in which the learning type control device 2 learns an operation command of the robot device 1 will be described with reference to FIGS. 4 to 6.

Figure 4:
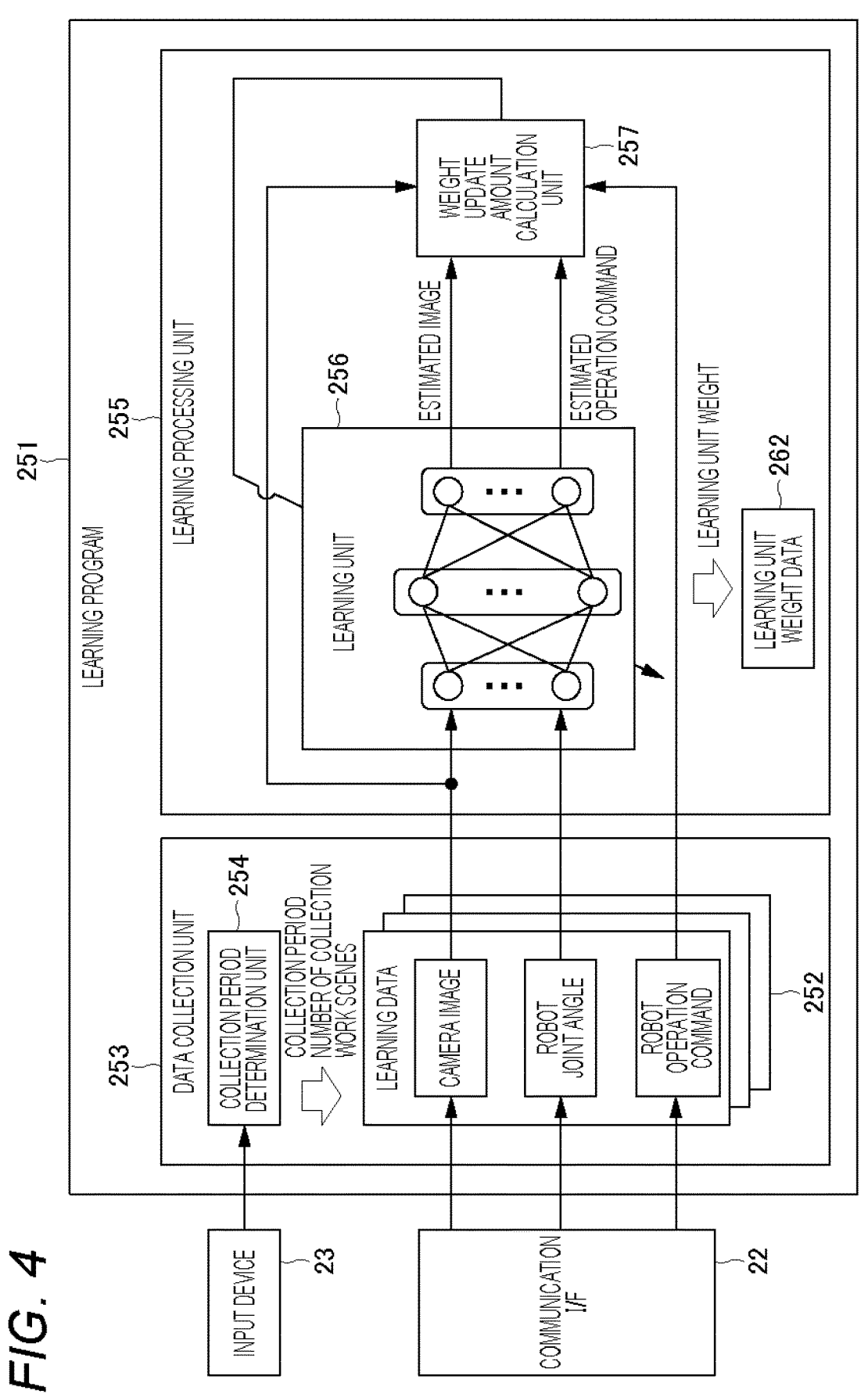
FIG. 4 is a schematic diagram illustrating an example of a software configuration of a learning program executed by a learning type control device in the robot control system according to the first embodiment of the present invention.

FIG. 4 is a schematic diagram illustrating an example of a software configuration of the learning program 251 executed by the learning type control device 2 in the robot control system 100.

Figure 5:
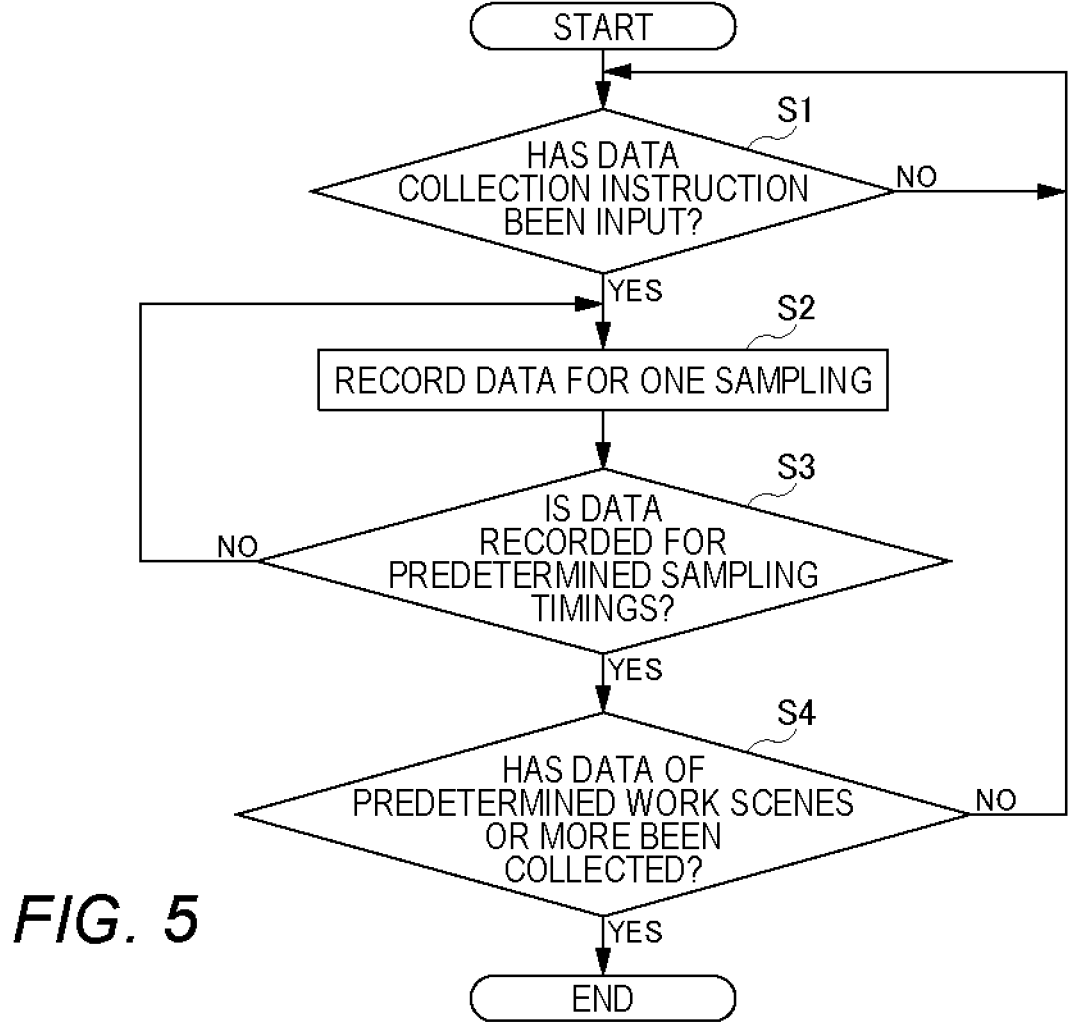
FIG. 5 is a flowchart illustrating an example of a procedure in which the learning program according to the first embodiment of the present invention collects learning data.

FIG. 5 is a flowchart illustrating an example of a procedure in which the learning program 251 collects the learning data 252.

Figure 6:
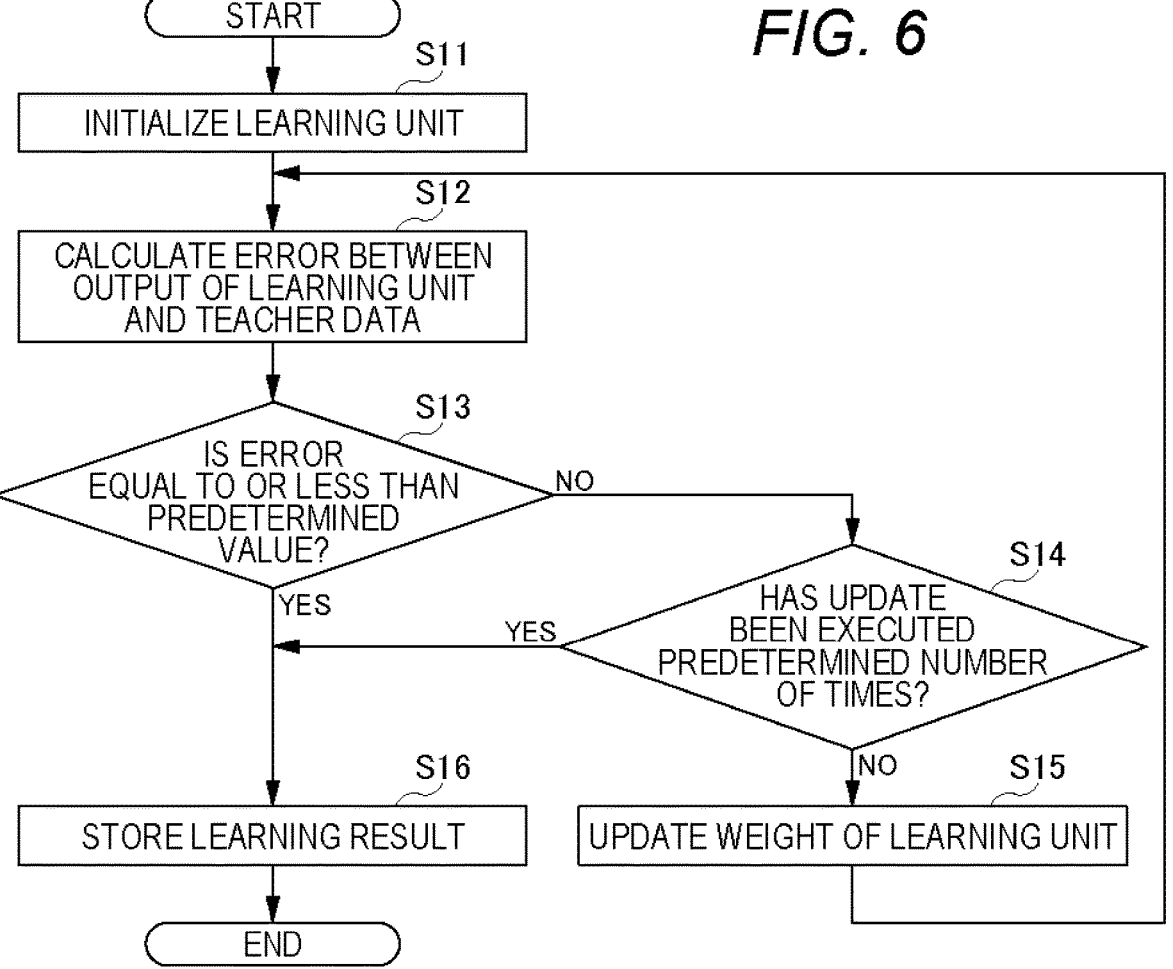
FIG. 6 is a flowchart illustrating an example of a procedure in which the learning program according to the first embodiment of the present invention subjects a learning unit to machine learning.

FIG. 6 is a flowchart illustrating an example of a procedure in which the learning program 251 subjects the learning unit 256 to machine learning.

Note that all of processing steps in FIG. 5 are executed at predetermined sampling timings in the learning type control device 2. Further, in the RAM of the control device 21, the number of times the learning unit 256 has been updated in step S15 (see FIG. 6) to be described later is stored, and the number of update times is called out from the RAM at the time of determining the number of update times in step S14. Further, the learning program 251 includes a data collection unit 253 and a learning processing unit 255 as software modules when being developed in the RAM of the control device 21 and executed by the CPU.

First, a method in which the data collection unit 253 of the learning program 251 collects the learning data 252 for a plurality of work scenes to subject the learning unit 256 to machine learning will be described with reference to FIG. 4. The data collection unit 253 includes a collection period determination unit 254 that determines a collection period of the learning data 252 based on an instruction of the user received via the input device 23. The user instructs to start and end acquisition of the learning data 252 using the input device 23.

The data collection unit 253 acquires a camera image of the camera 8 in the collection period determined by the collection period determination unit 254, a joint angle of the working robot 6, and a target joint angle as an operation command of the working robot 6 via the communication interface 22, and stores the acquired data in the storage device 24 as the learning data 252 in one work scene.

For example, the control program 521 of the robot control device 5 is programmed in advance such that a plurality of joint angles of the working robot 6 are specified to achieve the specified joint angles at predetermined times, respectively. Then, the data collection unit 253 acquires data for each sampling timing when work is executed by the control program 521 from the robot device 1, and stores the time-series data in the storage device 24 as one piece of the learning data 252. The data collection unit 253 collects pieces of the learning data 252 in the number of work scenes instructed by the input device 23. For example, the working robot 6 can collect a plurality of pieces of the learning data 252 with different positions and orientations of the workpiece 4 by learning the work of gripping the workpiece 4 stacked in bulk on the loading tray 32 as the work scene many times.

In FIG. 5, first, the collection period determination unit 254 of the data collection unit 253 determines whether a data collection instruction has been input from the user via the input device 23 (S1). Then, the collection period determination unit 254 advances the processing to step S2 if the data collection instruction has been input (YES in S1), and executes the determination processing of step S1 again and monitors the input of the data collection instruction if there is no data collection instruction (NO in S1).

Next, if it is determined that the data collection instruction has been input (YES in S1), the data collection unit 253 records a camera image, a joint angle of the working robot 6, and an operation command of the working robot 6 for one sampling in the learning data 252 in one work scene (S2), and proceeds to step S3.

Next, the data collection unit 253 determines whether data of a collection period specified by the user via the input device 23 is recorded (S3). Then, if the data of the specified collection period is not recorded (NO in S3), the data collection unit 253 returns the processing to step S2 and continues the data recording. On the other hand, if the data of the specified collection period is recorded (YES in S3), the data collection unit 253 determines that the learning data 252 in one work scene has been acquired, and advances the processing to step S4.

Next, the data collection unit 253 determines whether the learning data 252 in the number of work scenes equal to or larger than a number instructed via the input device 23 has been collected (S4). Then, when the collection of the learning data 252 of the instructed number of work scenes or more is not completed (NO in S4), the data collection unit 253 returns the processing to step S1 and continues the processing so as to collect the learning data 252 in a different work scene. On the other hand, when the collection of the learning data 252 in the instructed number of work scenes has been completed (YES in S4), the data collection unit 253 ends the series of processing.

Note that the determination of the start of data collection in step S1 and the determination of the end of the collection period in step S3 may be performed by different methods. For example, it may be configured such that data recording is started from the moment when the end effector 12 of the working robot 6 reaches a predetermined position, and data is recorded up to a point in time instructed by the user via the input device 23. Further, a content of the learning data 252 to be collected may be a content different from the camera image, the joint angle of the working robot 6, and the operation command of the working robot 6, or may be configured only by the camera image and the operation command of the working robot 6. Further, the operation command of the robot device 1 is not limited to the target joint angle of the working robot 6, and may be position information and orientation information represented by X, Y, and Z positions of the end effector 12 and yaw, pitch, and roll angles.

Machine Learning of Learning Unit

Next, returning to FIG. 4, a method in which the learning processing unit 255 of the learning program 251 subjects the learning unit 256 to the machine learning using the learning data 252 in the plurality of work scenes collected by the data collection unit 253 will be described.

The learning processing unit 255 includes the learning unit 256 and a weight update amount calculation unit 257.

When a camera image and a robot joint angle of the learning data 252 are input, the learning unit 256 outputs an estimated image obtained by reproducing a camera image at the time of learning (by performing processing such as noise removal) and an estimated operation command which is a target joint angle of the working robot 6. The estimated image is an example of a reproduction signal generated based on an output of the environment sensor. For example, a neural network including a plurality of layers can be applied to the learning unit 256. A weight and a bias are set to each of neurons constituting the neural network. One layer is formed by a plurality of neurons, and an intermediate layer is set between an input layer and an output layer.

The weight update amount calculation unit 257 compares the camera image of the learning data 252 and the estimated image output from the learning unit 256, and compares an operation command of the learning data 252 and the estimated operation command output from the learning unit 256 for each work scene. Then, the weight update amount calculation unit 257 calculates an update amount of a weight (weight such as a degree of coupling between the respective neurons of the neural network and an ignition (activation) threshold of each of the neurons) of the learning unit 256 such that the content of the learning data 252 matches the output of the learning unit 256. Although the update amount of the weight is calculated in this configuration, it may be configured to calculate an update amount of the bias in addition to the update amount of the weight.

Then, the learning processing unit 255 continues to update a weight of the learning unit 256 according to an update amount calculated by the weight update amount calculation unit 257 until a predetermined condition is reached. When the predetermined condition is reached, a weight of the learning unit 256 at that time is stored as the learning unit weight data 262.

Here, a procedure of processing in which the learning processing unit 255 updates a weight of the learning unit 256 will be described with reference to FIG. 6.

First, the learning processing unit 255 initializes the weight of the learning unit 256 (S11). Subsequently, the learning processing unit 255 calculates an error between an output of the learning unit 256 and train data by the weight update amount calculation unit 257 (S12).

Specifically, the weight update amount calculation unit 257 calculates an error between an estimated image output from the learning unit 256 and a camera image of learning data and an error between an estimated operation command output from the learning unit 256 and an operation command of the learning data, and advances the processing to step S13.

Next, the learning processing unit 255 determines whether the error calculated by the weight update amount calculation unit 257 in step S12 is equal to or less than a predetermined value or less (S13). Then, the learning processing unit 255 determines that an estimation result of the learning unit 256 is sufficiently correct and advances the processing to step S16 if the error is equal to or less than the predetermined value (YES in S13), and advances the processing to step S14 if the error exceeds the predetermined value (NO in S13).

For example, an error function including the error of the image and the error of the operation command is defined, and weights of the neural network are determined such that the error function becomes zero or minimum. Alternatively, learning of the camera image and learning of the operation command may be separately performed, and various methods are conceivable as a method for the learning (error calculation and weight determination).

If it is determined as NO in the determination step S13, the learning processing unit 255 determines whether update of the weight of the learning unit 256 has been performed a predetermined number of times in step S15 to be described later (S14). Then, if the weight of the learning unit 256 has been updated the predetermined number of times (YES in S14), the learning processing unit 255 determines that the update of the weight of the learning unit 256 has converged and advances the processing to step S16. Further, if the weight of the learning unit 256 has not been updated the predetermined number of times (NO in S14), the learning processing unit 255 advances the processing to step S15.

Next, if it is determined as NO in the determination step S14, the learning processing unit 255 calculates an update amount of the weight of the learning unit 256 based on a magnitude of the error calculated by the weight update amount calculation unit 257 in step S12. Then, the learning processing unit 255 updates the weight of the learning unit 256 according to the update amount of the weight of the learning unit 256 calculated by the weight update amount calculation unit 257 (S15), and increases the number of update times recorded in the RAM by one. After the processing of step S15, the learning processing unit 255 returns the processing to step S12 and repeats the update processing to optimize the learning unit 256.

If it is determined as YES in the determination step S13 or it is determined as YES in the determination step S14, the learning processing unit 255 stores the weight of the learning unit 256 (neural network) in the storage device 24 as the learning unit weight data 262 (S16), and ends the series of processing.

Note that FIG. 4 illustrates a simple multi-layer perceptron (MLP) as the neural network, but different networks may be used. For example, it may be configured to use a convolutional neural network (CNN), a recurrent neural network (RNN), or the like or to combine these networks. Further, a learning method of the learning unit 256 is not limited to the machine learning by deep learning using the neural network, and may be another learning method.

As described above, the learning unit 256 learns the operation command of the working robot 6 when the camera image reflecting the state of the workpiece 4 and the robot joint angle as a state of the working robot 6 are input, and outputs the estimated operation command. In the learning unit 256 to which the neural network is applied, information on the camera image and information on the robot joint angle are linked as the respective neurons are coupled, and as a result, the operation of the working robot 6 in association with the state of the workpiece 4 is learned. Therefore, at the time of execution of the learning unit calculation program 261 to be described later, the operation of the working robot 6 is not correctly executed in a situation where a camera image is different from the camera image when the learning data 252 has been acquired.

In the present embodiment, the learning unit 256 performs learning so as to output the estimated image obtained by reproducing the camera image at the same time as the estimated operation command, and the camera image input to the learning unit 256 and the operation of the working robot 6 are learned in association with each other due to the coupling of the respective neurons as described above. That is, the learning unit 256 performs learning to associate the estimated operation command and the estimated image with each other as well. Therefore, when the estimated image matches the camera image, it can be determined that the estimated operation command also matches the operation command of the learning data 252.

Further, the learning unit 256 performs learning so as to output the estimated image in which noise of the camera image has been smoothed in order to perform learning such that camera images of the plurality of pieces of learning data 252 coincide with the estimated image for a certain work scene. Therefore, the estimated image learned by the learning unit 256 is an image reflecting only the state of the workpiece 4 from which an instantaneous disturbance has been removed.

Method for Generating Operation Command

Next, a method in which the learning type control device 2 generates an operation command of the robot device 1 will be described with reference to FIGS. 7 to 9.

Figure 7:
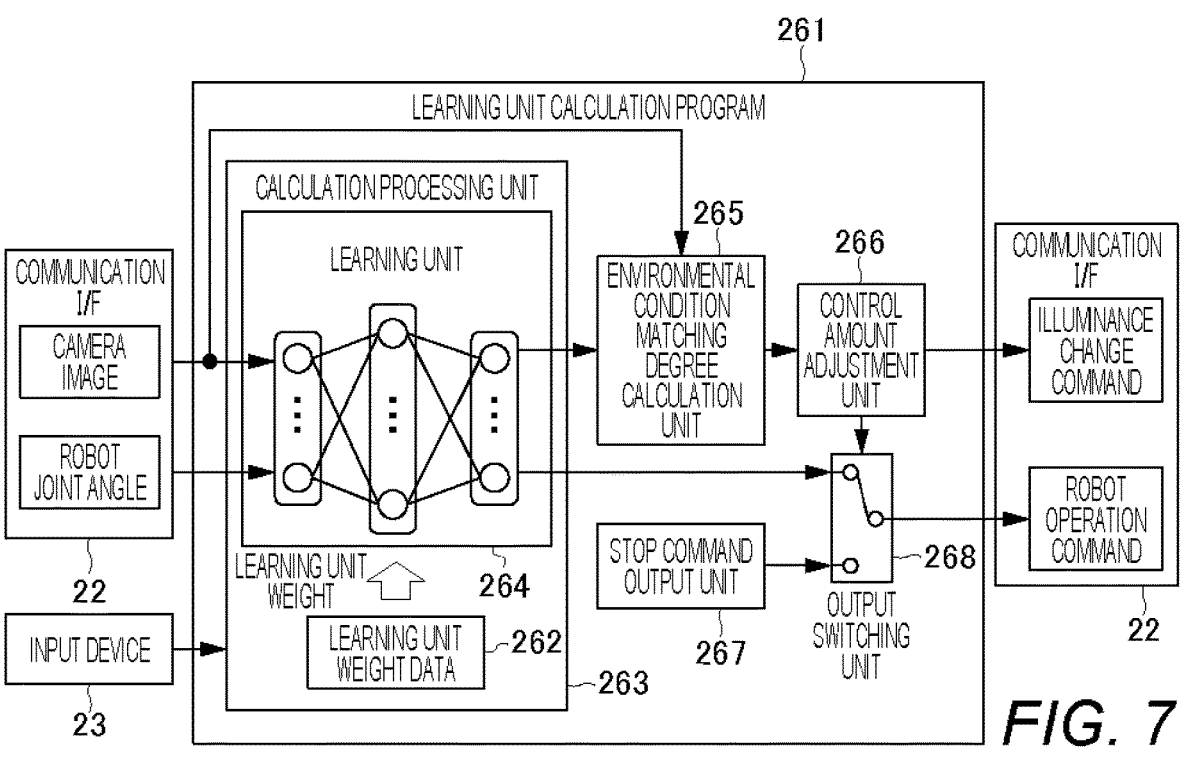
FIG. 7 is a schematic diagram illustrating an example of a software configuration of a learning unit calculation program executed by the learning type control device in the robot control system according to the first embodiment of the present invention.

FIG. 7 is a schematic diagram illustrating an example of a software configuration of the learning unit calculation program 261 executed by the learning type control device 2 in the robot control system 100. As illustrated in FIG. 7, the CPU of the control device 21 develops the learning unit calculation program 261 stored in the storage device 24 in the RAM and executes the program in the learning type control device 2. The learning unit calculation program 261 includes a calculation processing unit 263, an environmental condition matching degree calculation unit 265, a control amount adjustment unit 266, a stop command output unit 267, and an output switching unit 268 as software modules when being developed in the RAM of the control device 21 and executed by the CPU.

The calculation processing unit 263 includes the learning unit 264 that outputs an estimated image obtained by reproducing a camera image and an estimated operation command obtained by estimating a target joint angle of the working robot 6 when the camera image and a robot joint angle are input via the communication interface 22. A neural network can be applied to the learning unit 264 similarly to the learning unit 256. When there is an instruction to start the operation of the robot device 1 from the user via the input device 23, the calculation processing unit 263 applies a weight value of the learning unit weight data 262 generated by the learning program 251 of FIG. 4 to the learning unit 264. The learning unit 264 performs calculation processing (inference) based on the camera image and the robot joint angle to generate the estimated operation command. Then, the calculation processing unit 263 outputs the estimated operation command inferred by the learning unit 264 to the output switching unit 268 as a control signal of the working robot 6, and outputs the estimated image to the environmental condition matching degree calculation unit 265.

Based on the camera image of the camera 8, the environmental condition matching degree calculation unit 265 calculates a matching degree between an environmental condition of the robot device 1 when the learning unit 256 has machine-learned an operation command of the robot device 1 and a current environmental condition of the robot device 1, and outputs a calculation result to the control amount adjustment unit 266.

The control amount adjustment unit 266 (an example of an adjustment unit) adjusts a content of the operation command of the robot device 1 and/or a setting of the camera 8 according to the calculation result of the environmental condition matching degree calculation unit 265, and outputs an adjustment result to the robot control device 5 via the communication interface 22. Further, the control amount adjustment unit 266 outputs a switching signal to the output switching unit 268 based on a difference between the estimated image obtained by reproducing the camera image of the camera 8 output by the learning unit 256 and a current camera image of the camera 8.

The output switching unit 268 outputs either the operation command (estimated operation command) estimated by the learning unit 264 or a stop command output by the stop command output unit 267 to the robot control device 5 via the communication interface 22 as a robot operation command based on the switching signal of the control amount adjustment unit 266.

Figure 8:
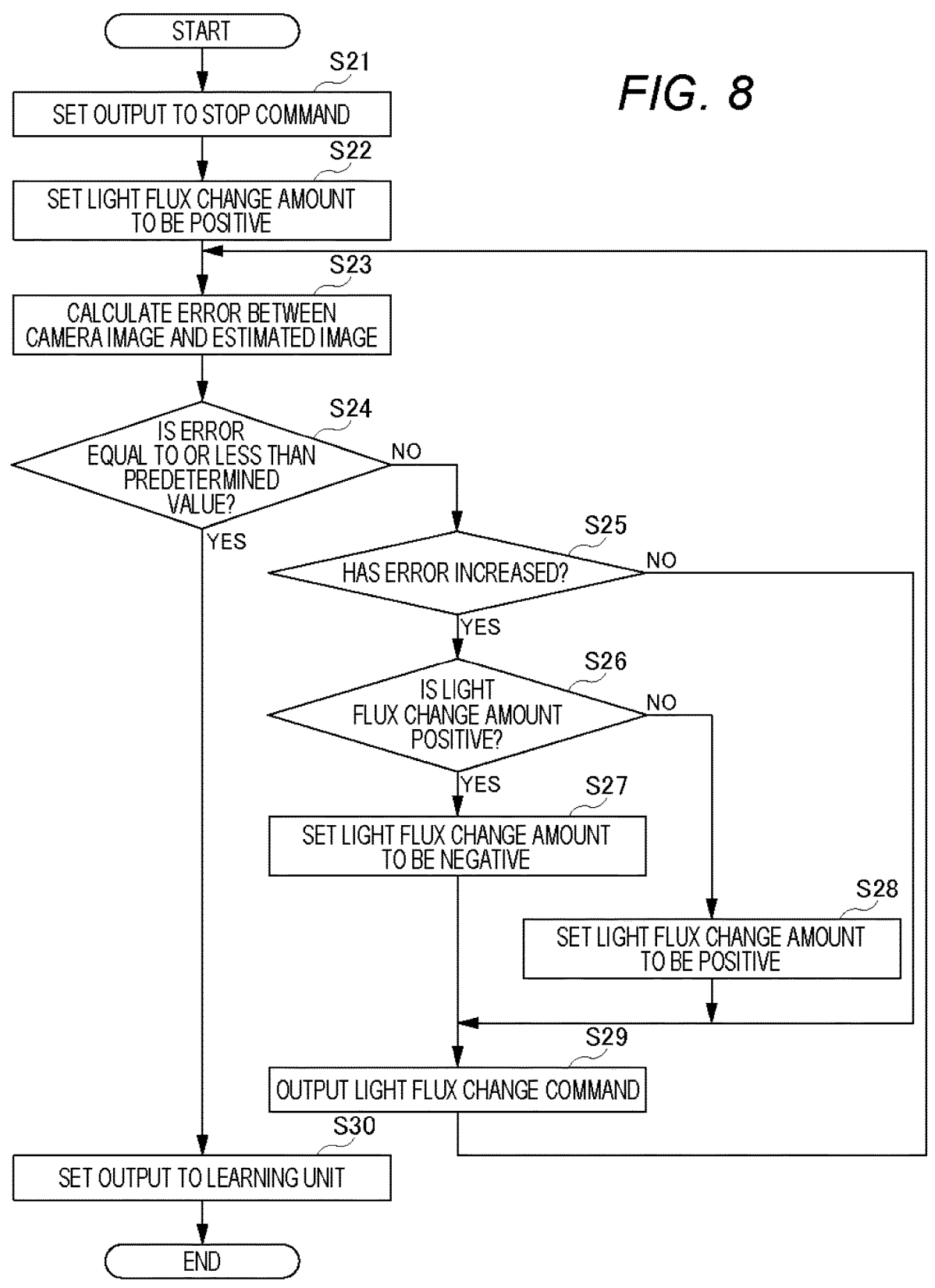
FIG. 8 is a flowchart illustrating a procedure example of a method in which the learning unit calculation program calculates a matching degree of an environmental condition of the robot device and adjusts a control amount in the robot control system according to the first embodiment of the present invention.

Adjustment of Control Amount based on Matching Degree of Environmental Condition FIG. 8 is a flowchart illustrating a procedure example of a method (a calculation process and an adjustment process) in which the learning unit calculation program 261 calculates a matching degree of an environmental condition of the robot device 1 to adjust a control amount in the robot control system 100.

Figure 9:
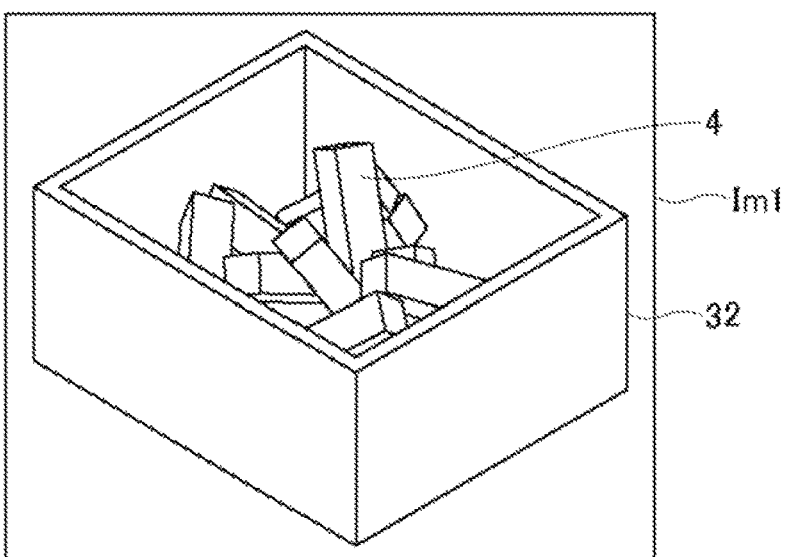
FIG. 9 is a schematic view illustrating a method in which an environmental condition matching degree calculation unit calculates the matching degree of the environmental condition of the robot device in the robot control system according to the first embodiment of the present invention.
Figure 9:
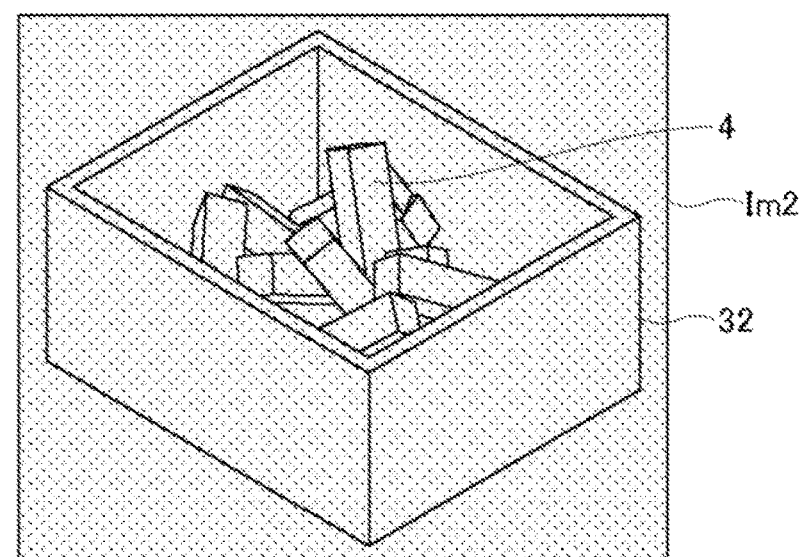
Figure 9:
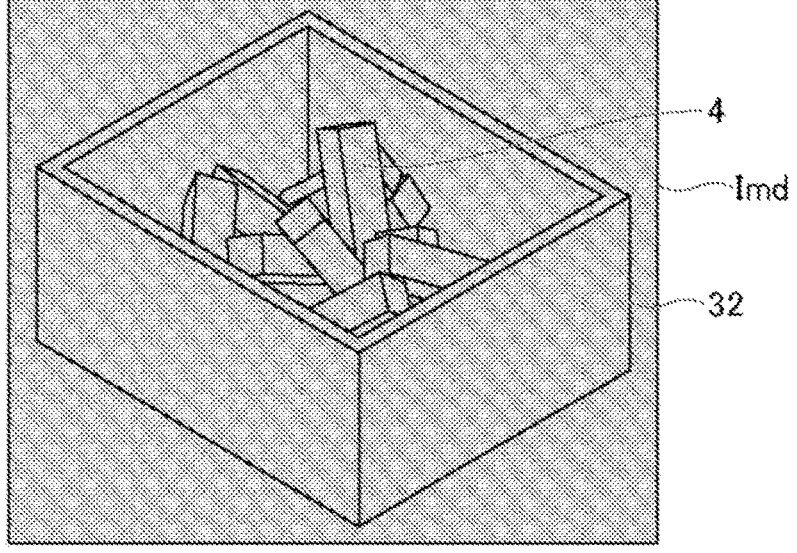

FIG. 9 is a schematic view illustrating a method in which the environmental condition matching degree calculation unit 265 calculates the matching degree of the environmental condition of the robot device 1 in the robot control system 100. FIG. 9 illustrates an image of the workpieces 4 stacked in bulk on the loading tray 32.

All the processing steps in FIG. 8 are executed at predetermined sampling timings in the learning type control device 2. Further, the RAM of the control device 21 stores a light flux correction amount of illumination light of the lighting device 7 set in each of steps S22, S27, and S28. The control device 21 calls the light flux correction amount of the illumination light stored in the RAM when adjusting the luminance (illuminance) around a working position of the robot device 1 as the environmental condition of the robot device 1, which will be described later.

In FIG. 8, first, the control amount adjustment unit 266 of the learning unit calculation program 261 outputs a switching instruction to the output switching unit 268 such that a stop command with respect to the working robot 6 is an output of the stop command output unit 267, and stops the working robot 6 (S21). The working robot 6 operates improperly as an estimated operation command of the learning unit 264 is inappropriate until the adjustment of the luminance of the lighting device 7 to be changed in steps S22 to S29, which will be described later, is completed. In order to prevent this, the learning unit calculation program 261 outputs a stop command to the communication interface 22 to stop the working robot 6.

Next, the control amount adjustment unit 266 sets a light flux change amount to be positive so as to make the light flux of the illumination light of the lighting device 7 brighter than a current value by a predetermined amount (S22). For example, the illumination light of the lighting device 7 becomes brighter by setting a voltage applied to the lighting device 7 to a value larger by a predetermined amount based on the positive light flux change amount. A relationship between the light flux of the illumination light of the lighting device 7 and the applied voltage is stored in advance in the ROM or the storage device 24 in the form of a correlation equation or a reference table.

Next, the environmental condition matching degree calculation unit 265 calculates an error between a camera image acquired from the camera 8 and an estimated image output by the learning unit 264 (S23). For example, in a case where an environmental condition of the camera image acquired from the camera 8 at the time of machine learning of the learning unit weight data 262 applied to the learning unit 264 is an environmental condition (a condition where the surroundings are bright) such as an image Im1 illustrated in the upper part of FIG. 9, the estimated image output by the learning unit 264 is a bright image similarly to the image Im1 in the upper part of FIG. 9. On the other hand, in a case where the periphery of the workpiece 4 is dark when the learning unit 256 has been subjected to the machine learning, the camera image acquired from the camera 8 becomes a slightly dark image such as an image Im2 in the middle part of FIG. 9.

In the present embodiment, the neural network performs estimation so as to reproduce the machine-learned camera image even under such an environmental condition, the estimated image output by the learning unit 264 is the bright image similarly to the image Im1 in the upper part of FIG. 9.

Here, when a difference between the estimated image corresponding to the image Im1 as illustrated in the upper part of FIG. 9 and the actual camera image (image Im2) as illustrated in the middle part of FIG. 9 is obtained, a difference image Imd as illustrated in the lower part of FIG. 9 is obtained. When there is no difference, the entire image (all pixels) is black. However, when a current environmental condition is different from the environmental condition when the learning unit 256 has been subjected to the machine learning, a difference between the environmental conditions appears as an image as illustrated in the lower part of FIG. 9. The environmental condition matching degree calculation unit 265 calculates and outputs the sum of output values (error amounts) of the respective pixels in the difference image Imd as illustrated in the lower part of FIG. 9 as an error between the camera image and the estimated image. As the sum of the output values of the respective pixels in the difference image Imd is smaller, the matching degree between the camera image and the estimated image is higher.

The description will be continued returning to FIG. 8. Next, the control amount adjustment unit 266 determines whether the error calculated by the environmental condition matching degree calculation unit 265 in step S23 is equal to or less than a predetermined value (S24). Then, if the error is equal to or less than the predetermined value (YES in S24), the control amount adjustment unit 266 determines that the environmental condition at the time of generating the estimated operation command is substantially the same as that at the time of the machine learning of the learning unit weight data 262 applied to the learning unit 264, and advances the processing to step S30. On the other hand, if the error exceeds the predetermined value (NO in S24), the control amount adjustment unit 266 determines that the environmental conditions are not the same between the time when the learning unit 256 has performed the machine learning and the time when the learning unit 264 performs the inference, and advances the processing to step S25.

If it is determined as NO in the determination step S24, the control amount adjustment unit 266 determines whether the error calculated in step S23 has increased from an error calculated previously (for example, at a previous sampling timing) (S25). Then, if the error has increased (YES in S25), the control amount adjustment unit 266 determines that the current environmental condition deviates from the environmental condition at the time of machine learning of the learning unit weight data 262 since the light flux change amount set in step S22 has been applied to the lighting device 7 (to brighten or darken the lighting device 7), and advances the processing to step S26. On the other hand, if the error does not increase with the light flux change amount set in step S22 (NO in S25), the control amount adjustment unit 266 advances the processing to step S29.

If it is determined as YES in the determination step S25, the control amount adjustment unit 266 determines whether the light flux change amount is positive, that is, whether the correction has been made in a direction of brightening or darkening the illumination light (S26). Then, if the light flux change amount is positive (YES in S26), the control amount adjustment unit 266 sets the light flux change amount to be negative, that is, to darken the illumination light of the lighting device 7 by the predetermined light flux change amount (S27).

On the other hand, if the light flux change amount is negative (NO in S26), the control amount adjustment unit 266 sets the light flux change amount to be positive, that is, to brighten the illumination light of the lighting device 7 by the predetermined light flux change amount (S28). After the processing of step S27 or S28, the control amount adjustment unit 266 advances the processing to step S29.

Next, the control amount adjustment unit 266 outputs a light flux change command to the robot control device 5 via the communication interface 22 such that the luminance of the illumination light of the lighting device 7 changes by the light flux change amount set in step S22, S27, or S28 (S29). After the processing of step S29, the control amount adjustment unit 266 returns the processing to step S23, and continues the adjustment of light and shade of the lighting device 7 such that the current environmental condition matches the environmental condition when the learning unit 256 has been subjected to the machine learning.

if the error between the camera image and the estimated image is equal to or less than the predetermined value in determination step S24 (YES in S24), it can be determined that the current environmental condition is substantially the same as that at the time of the machine learning of the learning unit weight data 262 applied to the learning unit 264. In this regard, when the error between the camera image and the estimated image is equal to or less than the predetermined value, the control amount adjustment unit 266 sets the switching signal such that the estimated operation command of the learning unit 264 is output as the operation command to the robot device 1, and outputs a switching signal to the output switching unit 268 to end the series of processing (S30).

The learning type control device 2 outputs the adjusted operation command of the robot device 1 to the robot control device 5 via the communication interface 22. The robot control device 5 generates a control command of the robot device 1 based on the adjusted operation command of the robot device 1 received from the learning type control device 2, and outputs the control command to the robot device 1 via the control interface 53. The robot device 1 operates according to the control command generated based on the adjusted operation command received from the robot control device 5 (an operation process).

As described above, the camera image, the robot joint angle, the estimated image, and the estimated operation command are associated with each other due to the coupling of the respective neurons of the neural network constituting the learning unit 264. Therefore, when the estimated image output from the learning unit 264 matches the camera image (the error is equal to or less than the predetermined value), it can be determined that a content of the estimated operation command output from the learning unit 264 is similar to that of the operation command of the learning data 252. On the other hand, when the estimated image of the learning unit 264 does not match the camera image, it can be determined that the content of the estimated operation command of the learning unit 264 is not similar to that of the operation command of the learning data 252. In this case, the learning type control device 2 changes the luminance of the illumination light of the lighting device 7 such that the environmental condition at the time of learning by the learning unit 256 coincides with the current environmental condition, whereby the working robot 6 operates correctly.

Further, in a case where a camera image when the learning data 252 has been acquired is stored and the camera image is compared with the current camera image, an error between both the images sometimes decreases by chance due to an instantaneous disturbance (noise or the like). However, the estimated image is not affected by the instantaneous disturbance since the estimated image output from the learning unit 264 is the image reflecting only the state of the workpiece 4 from which the instantaneous disturbance has been removed as described above. Therefore, when the current camera image (environmental condition) matches the estimated image (environmental condition) at the time of learning by the learning unit 256, the environmental condition matching degree calculation unit 265 can more accurately determine that the content of the estimated operation command is similar to that of the operation command of the learning data 252.

Meanwhile, the example in which the learning unit 256 outputs the estimated image based on the camera image of the camera 8 at the time of learning in the above-described embodiment, but information (feature information) indicating the environment at the time of learning is not limited to the estimated image output by the learning unit 256. For example, as the information indicating the environment at the time of learning, a camera image obtained by the camera 8 at the time of learning or distance measurement data of a distance measuring device to be described later may be used. That is, the environmental condition matching degree calculation unit 265 may be configured to compare the output of the environment sensor (the camera 8 or the distance measuring device) when the learning unit 264 (trained model) has learned the operation commands of the robot device 1 and the current output of the environment sensor, and calculate the matching degree between the environmental condition of the robot device 1 at the time of learning and the current environmental condition of the robot device 1. For example, in a case where a camera image is used as the information indicating the environment at the time of learning, a camera image closest to an average of a plurality of camera images among the plurality of camera images or a camera image corresponding to a median value of the plurality of camera images can be used based on information of each of pixels of the plurality of camera images.

Even in such a configuration, the learning type control device 2 can adjust a content of the operation command and/or a setting of the environment sensor such that the current environmental condition matches the environmental condition at the time of learning. As a result, the accuracy of inference of the operation command of the trained model machine-learned to generate the operation command of the robot device 1 according to the output of the environment sensor is improved, and the learning type control device 2 can output the appropriate operation command to the robot device.

Note that a magnitude of the light flux change amount set in step S22, S27, or S28 in FIG. 8 is not necessarily a fixed value, and for example, it may be configured to set the magnitude of the light flux change amount in proportion to a magnitude of the error between the camera image and the estimated image. Further, the control amount adjustment unit 266 adjusts the light and shade (brightness) and the color (saturation) of the image acquired from the camera 8 by outputting a command to physically change the luminance of the illumination light of the lighting device 7, but other methods may be used. For example, the control amount adjustment unit 266 may be configured to change a setting value of the camera 8 by software to adjust the image quality (light and shade and color) of the image acquired from the camera 8.

Further, a command output from the control amount adjustment unit 266 may be not only the change command (change amount) of the light and shade of the illumination light of the lighting device 7 but also a movement amount of the lighting device moving mechanism 13 that changes a position of the lighting device 7 and a movement amount of the camera moving mechanism 14 that changes a position of the camera 8. In this case, the control amount adjustment unit 266 may be configured to command a movement direction and the movement amount of the lighting device moving mechanism 13 or the camera moving mechanism 14 using a gradient of the magnitude of the error between the estimated image and the camera image.

Further, the present invention is not limited to the configuration in which the control amount adjustment unit 266 issues the command to the camera moving mechanism 14 to physically change the distance from the workpiece 4 to the camera 8. For example, the control amount adjustment unit 266 may adjust a size of the workpiece 4 appearing in the camera image by changing a setting of a zoom function (zoom-in or zoom-out) of the camera 8, that is, a focal length of an optical system. Alternatively, the change of the movement amount of the camera 8 by the camera moving mechanism 14 and the change of the setting of the zoom function of the camera 8 may be used together.

Further, the change amount of the above-described element (control amount) is not only adjusted by the method illustrated in FIG. 8, but a learning unit configured to learn and calculate the change amount may be prepared separately from the learning unit 264. For example, the control amount adjustment unit 266 may include the learning unit (not illustrated) therein and be configured to cause the learning unit to learn a relationship between the learning data 252 and the change amount and adjust the light flux correction amount, the movement amount of the camera 8 by the lighting device moving mechanism 13, or the camera setting value using a learning result of the learning unit. Further, the movement amount of the camera 8 by the camera moving mechanism 14 and the perspective setting (enlargement and reduction) of the camera 8 may be adjusted by the learning unit inside the control amount adjustment unit 266.

Further, the determination of the magnitude of the error between the camera image and the estimated image illustrated in steps S23 and S24 of FIG. 8 is not limited to the configuration executed before the operation of the working robot 6. For example, the processing in steps S23 to S29 may be configured to be periodically performed after the output of the output switching unit 268 is switched to the side of the learning unit 264 in step S30, and the environmental condition may be configured to be changed even during the operation of the working robot 6.

Note that the environment sensor measuring the environmental condition of the robot device 1 is not limited to the camera 8, and the distance measuring device using optical or radio waves may be used. For example, the environmental condition may be measured by measuring a shape (reflection signal) of the workpiece 4 or an object in the periphery thereof using light detection and ranging or laser imaging detection and ranging (LIDAR) that uses laser. The shape of the object around the workpiece 4 is, for example, a shape of a tray that stores the workpiece 4, a conveyance line, or the like. In a case where the distance measuring device is used as the environment sensor, the learning units 256 and 264 output, as the reproduction signal, estimated distance measurement data obtained by performing predetermined disturbance removal processing (noise removal or the like) on the reflection signal (distance measurement data) that the distance measuring device has projected onto the object and received. The distance measurement data is point cloud data in which a reflected signal obtained from the object is associated with a position where the reflected signal is obtained.

Further, the working robot 6 has been described as an example of the robot body in the present embodiment, but the robot body may be a movable autonomous robot that provides services. The autonomous robot includes an environment sensor. Further, the peripheral devices are attached to the autonomous robot itself in the autonomous robot. Note that the environment sensor may be installed in an environment (building) in which the autonomous robot moves.

As described above, the robot control system (the robot control system 100) according to the first embodiment is a robot control system including: a robot device (the robot device 1); an environment sensor (the camera 8 or the distance measuring device) that acquires an environmental condition of the robot device; and a control device (the learning type control device 2) that inputs a current output of the environment sensor to a trained model (the learning unit 264), obtained by machine learning for generation of an operation command of the robot device corresponding to an output of the environment sensor, to generate an operation command of the robot device corresponding to the current output of the environment sensor output from the trained model, and controls an operation of the robot device.

The control device includes: an environmental condition matching degree calculation unit (the environmental condition matching degree calculation unit 265) that calculates a matching degree between an environmental condition of the robot device when the trained model has machine-learned the operation command of the robot device and a current environmental condition of the robot device based on the current output of the environment sensor; and an adjustment unit (the control amount adjustment unit 266) that adjusts a content of the operation command of the robot device and/or a setting of the environment sensor based on a calculation result of the environmental condition matching degree calculation unit.

In the robot control system according to the first embodiment configured as described above, the adjustment unit of the control device compares the environmental condition when the trained model that generates the operation command of the robot device has been subjected to the machine learning with the current environmental condition, and calculates the matching degree (difference) between both the environmental conditions. Then, the adjustment unit of the control device adjusts the content of the operation command of the robot device and/or the setting of the environment sensor based on the calculation result of the matching degree such that an error between the current environmental condition and the environmental condition at the time of learning becomes equal to or less than a predetermined value. As a result, it is possible to improve the accuracy of inference of the trained model machine-learned to generate the operation command of the robot device according to the current output of the environment sensor, and output the appropriate operation command to the robot device. Therefore, when it is detected that the current environmental condition of the robot device using the trained model is different from the environmental condition at the time of learning, the robot device can appropriately execute work.

Further, with the above configuration, machine learning of a learning model (the learning unit 256) in a work scene having the same work content (for example, work of gripping the workpieces 4 stacked in bulk on a certain tray) and a different environmental condition becomes unnecessary, and the robot device can be controlled by the machine learning with a fewer work scenes. Therefore, the time and effort required for the machine learning of the learning model can be reduced.

Furthermore, in the robot control system (the robot control system 100) according to the present embodiment, the trained model (the learning unit 264) is a trained model obtained by performing machine learning to generate a reproduction signal (estimated image or estimated distance measurement data) of the output of the environment sensor in addition to the operation command of the robot device corresponding to the output of the environment sensor (the camera 8 or the distance measuring device), and is configured to generate the operation command of the robot device (the robot device 1) corresponding to the current output of the environment sensor and the reproduction signal of the output of the environment sensor at a time of learning when the current output of the environment sensor is input.

Then, the environmental condition matching degree calculation unit (the environmental condition matching degree calculation unit 265) calculates a difference between the reproduction signal of the output of the environment sensor at the time of learning output by the trained model and the current output of the environment sensor as the matching degree between the environmental conditions.

Further, the adjustment unit (control amount adjustment unit 266) adjusts the content of the operation command of the robot device and/or the setting of the environment sensor such that the difference between the reproduction signal of the output of the environment sensor at the time of learning output by the trained model and the current output of the environment sensor is equal to or less than a predetermined value.

In the robot control system configured as described above, the trained model is subjected to the learning to generate the reproduction signal of the output of the environment sensor in addition to the operation command of the robot device corresponding to the output of the environment sensor. Since the reproduction signal is a signal from which an instantaneous disturbance has been removed, the trained model outputs information from which the instantaneous disturbance has been removed and which reflects only a state of the workpiece based on the output of the environment sensor. Therefore, the environmental condition matching degree calculation unit can more accurately calculate the matching degree between the environmental condition of the robot device at the time of learning and the current environmental condition of the robot device.

Further, in the robot control system (the robot control system 100) according to the present embodiment, the robot device (the robot device 1) includes a robot body (the working robot 6) and a peripheral device arranged in the robot body or around the robot body, and the peripheral device is a device (the lighting device 7) that changes illuminance inside the robot device or around the robot device, and the environment sensor (the camera 8) has a function of obtaining an image signal of an optical image including a workpiece handled by the robot device, and a function of changing brightness or saturation of a captured image (camera image) based on the image signal or a size of the workpiece appearing in the captured image (changing the image quality or changing the focal length of the optical system).

Then, the environmental condition matching degree calculation unit (the environmental condition matching degree calculation unit 265) compares an estimated image, estimated by the trained model (the learning unit 264) from a plurality of the image signals at the time of learning as the reproduction signal of the output of the environment sensor at the time of learning with the captured image (camera image) as the current output of the environment sensor, and calculates a difference in the brightness, the saturation, or the size of the workpiece appearing in the captured image between the estimated image and the captured image.

Further, the adjustment unit (the control amount adjustment unit 266) adjusts a content of an operation command to the peripheral device and/or the setting of the environment sensor such that the difference in the brightness, the saturation, or the size of the workpiece appearing in the captured image between the estimated image and the captured image is equal to or less than a predetermined value.

According to the robot control system configured as described above, the content of the operation command with respect to the peripheral device and/or the setting of the environment sensor are adjusted such that the difference in the brightness, the saturation, or the size of the workpiece appearing in the captured image between the estimated image at the time of learning generated by the trained model and the current captured image of the environment sensor is equal to or less than the predetermined value. Therefore, the brightness or the saturation of the captured image of the environment sensor at the time of work, or the size of the workpiece appearing in the captured image is changed in a direction matching the content at the time of learning. Therefore, the inference accuracy of the operation command of the trained model is improved, and the control device (the learning type control device 2) can output an appropriate operation command to the peripheral device and/or appropriately set the environment sensor.

Further, in the robot control system (the robot control system 100) according to the present embodiment, the robot device (the robot device 1) includes a robot body (the working robot 6) and a peripheral device arranged in the robot body or around the robot body, the peripheral device is a first moving mechanism (the lighting device moving mechanism 13) that changes a position of a device (the lighting device 7) that changes illuminance inside the robot device or around the robot device or a second moving mechanism (the camera moving mechanism 14) that changes a position of the environment sensor (the camera 8), and the environment sensor (the camera 8) is configured to have a function of obtaining an image signal of an optical image including a workpiece handled by the robot device.

Then, the environmental condition matching degree calculation unit (the environmental condition matching degree calculation unit 265) compares an estimated image, estimated by the trained model (the learning unit 264) from a plurality of the image signals (pieces of the learning data 252) as the reproduction signal of the output of the environment sensor at the time of learning with a captured image (camera image) based on the image signal as the current output of the environment sensor, and calculates a difference in brightness or saturation between the estimated image and the captured image or a difference in a positional relationship between the workpiece and the robot device.

Further, the adjustment unit (the control amount adjustment unit 266) adjusts a content of an operation command to the peripheral device such that the difference in the brightness or the saturation between the estimated image and the captured image or the difference in the positional relationship between the workpiece and the robot device is equal to or less than a predetermined value.

According to the robot control system having the above configuration, the content of the operation command with respect to the peripheral device is adjusted such that the difference in the brightness or the saturation between the estimated image at the time of learning generated by the trained model and the current captured image of the environment sensor or the difference in the positional relationship between the workpiece and the robot device is equal to or less than the predetermined value. Therefore, the brightness or the saturation of the captured image of the environment sensor at the time of work, or the positional relationship between the workpiece and the robot device is changed in the direction matching the content at the time of learning. Therefore, the inference accuracy of the operation command of the trained model is improved, and the control device (the learning type control device 2) can output an appropriate operation command to the peripheral device.

Second Embodiment

As a second embodiment of the present invention, a method in which a robot control system adjusts a control content according to a matching degree between a current environmental condition and an environmental condition at the time of learning will be described with reference to FIGS. 10 and 11.

An arrangement of a conveyance line is sometimes changed due to a constraint of a site in the process as illustrated in FIG. 3. For example, a case where arrangements of the loading line 31 and the unloading tray line 33 are switched from those in FIG. 3 (case where the loading line 31 is in front of the working robot 6 and the unloading tray line 33 is on the left of the working robot 6) will be considered. At this time, the working robot 6 grips the workpieces 4 stacked in bulk on the loading tray 32 on the loading line 31 in front of the working robot 6. Then, the working robot 6 aligns and arranges the workpieces 4 on the unloading tray 35 to be unloaded to the left of the working robot 6, and transports the unloading tray 35 from the left of the working robot 6 to the unloading line 34 on the right of the working robot 6.

In order to cope with such a process, in the machine learning of the operation command illustrated in FIGS. 4 to 6, pieces of the learning data 252 are separately acquired in the operation of gripping the workpiece 4 on the left of the working robot 6 and the operation of gripping the workpiece 4 in front of the working robot 6, and the weight of the learning unit 256 are machine-learned with the both. The reason why the machine learning is performed in this manner is that a configuration of a neural network becomes higher order (the number of neurons and the number of intermediate layers become larger) when the single learning unit 256 is subjected to the machine learning of pieces of work whose operations are significantly different. As the configuration of the neural network becomes higher order, robustness is lost, and there is a possibility that it is difficult for the learning unit 256 to output an appropriate operation command.

It is said that a neural network is likely to be over-trained (adapted only to train data) when its configuration is high order. Further, in a case where operations of pieces of work are significantly different, there is also a concern that an average operation command is output for all the operations. Therefore, it is desirable to perform machine learning of the learning units 256 respectively for operations and appropriately switch a plurality of pieces of the obtained learning unit weight data 262 according to a current environmental condition.

Method of Switching Learning Unit

Next, a method of selecting and switching one learning unit from among a plurality of learning units machine-learned by the learning type control device 2 in the robot control system 100 according to the second embodiment will be described with reference to FIGS. 10 and 11.

Figure 10:
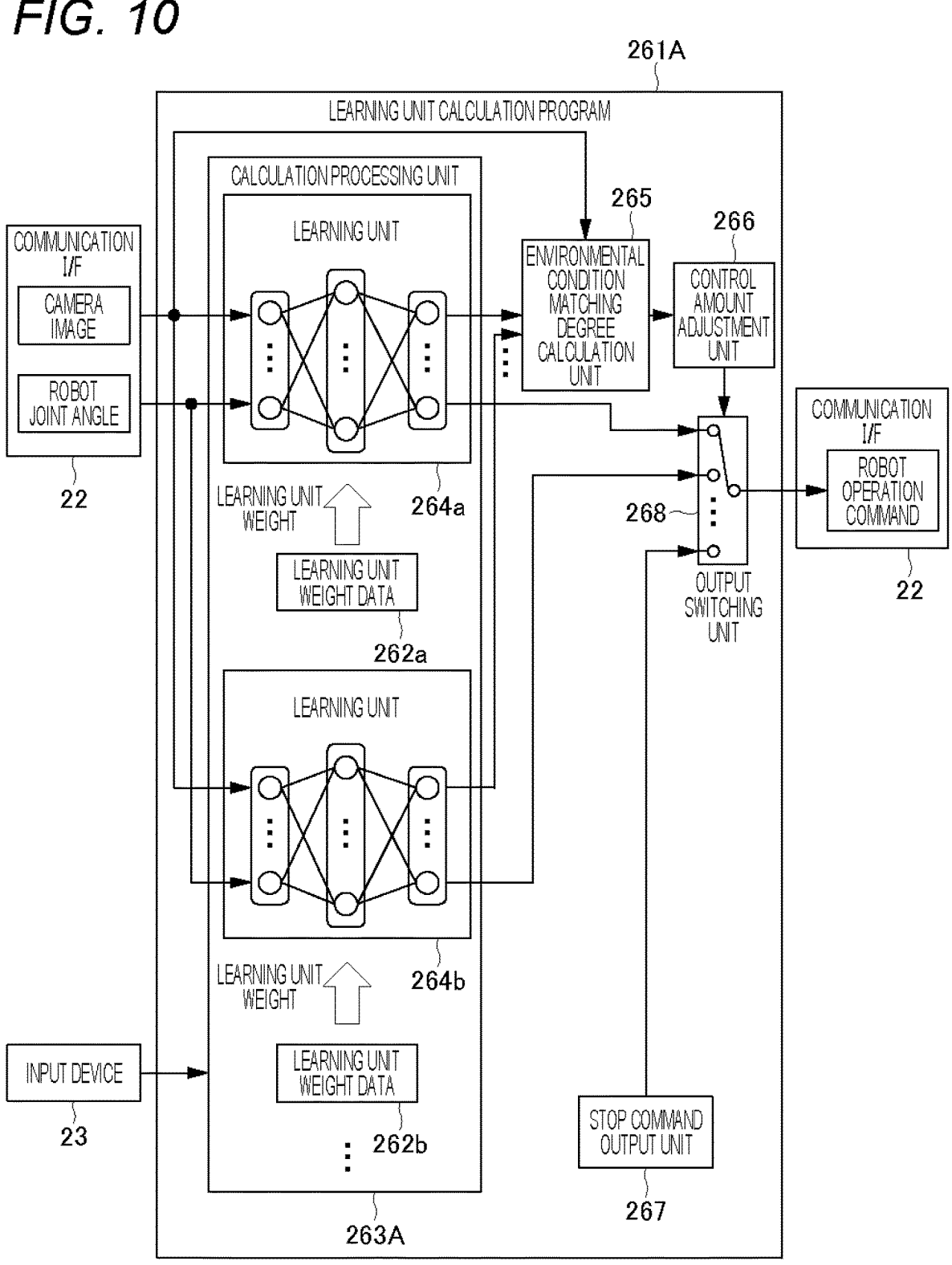
FIG. 10 is a schematic diagram illustrating an example of a software configuration of a learning unit calculation program executed by a learning type control device in a robot control system according to a second embodiment of the present invention.

FIG. 10 is a schematic diagram illustrating an example of a software configuration of a learning unit calculation program executed by the learning type control device 2.

Figure 11:
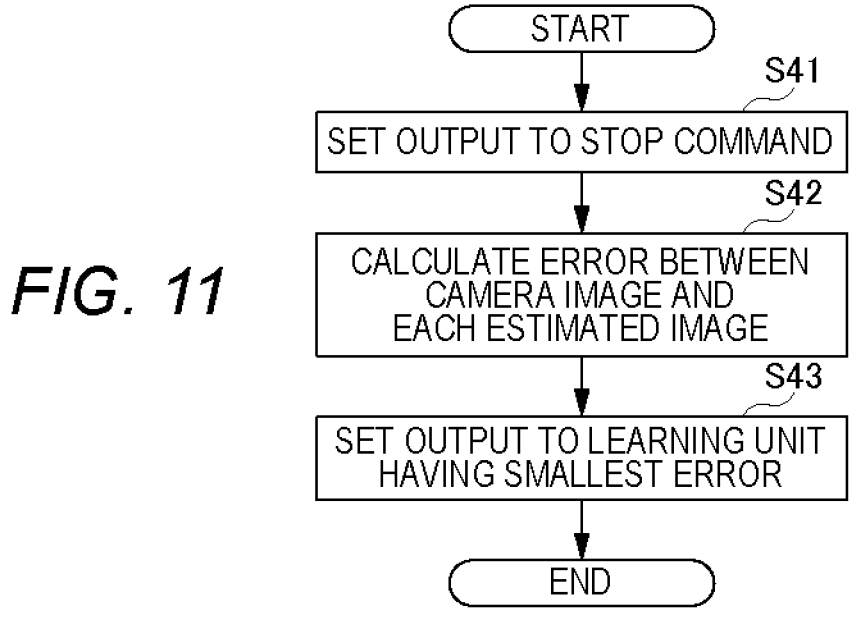
FIG. 11 is a flowchart illustrating a procedure example of a method in which a learning unit calculation program selects one learning unit from a plurality of machine-learned learning units in the robot control system according to the second embodiment of the present invention.

FIG. 11 is a flowchart illustrating a procedure example of a method in which the learning unit calculation program selects one learning unit from among the plurality of machine-learned learning units.

A learning unit calculation program 261A illustrated in FIG. 10 is different from the learning unit calculation program 261 in FIG. 7 in terms of including a calculation processing unit 263A in which a plurality of learning units are prepared. FIG. 10 illustrates the plurality of learning units which are different. Hereinafter, two learning units will be described by changing reference signs respectively for pieces of learning unit weight data applied thereto.

The calculation processing unit 263A applies learning unit weight data 262*a* to a learning unit 264*a* and applies learning unit weight data 262*b* to a learning unit 264*b*. When a plurality of camera image and robot joint angle are input via the communication interface 22, each of the learning units 264*a* and 264*b* is configured to output a plurality of estimated image obtained by reproducing the camera image and estimated operation command of the working robot 6. The learning units 264*a* and 264*b* can be configured using a neural network similarly to the learning unit 264.

Here, a procedure example of a method in which the learning unit calculation program 261A selects one learning unit from among the plurality of learning units 264*a* and 264*b* subjected to machine learning will be described with reference to FIG. 11. In FIG. 11, first, the control amount adjustment unit 266 outputs a switching instruction to the output switching unit 268 such that an operation command with respect to the working robot 6 is an output from the stop command output unit 267 (S41).

Next, the environmental condition matching degree calculation unit 265 calculates an error between the estimated image output from each of the learning units 264*a* and 264*b* and the camera image (S42). For example, a learning unit to which a learning result regarding the operation of gripping the workpieces 4 stacked in bulk on the left of the working robot 6 is applied as described above is defined as the learning unit 264*a*, and a learning unit to which a learning result regarding the operation of gripping the workpieces 4 stacked in bulk in front of the working robot 6 is applied is defined as the learning unit 264*b*.

In this case, in an environment illustrated in FIG. 3, an error between the estimated image output from the learning unit 264*a* and the camera image of the camera 8*a* is small, but an error between the estimated image output from the learning unit 264*b* and the camera image of the camera 8*a* is large. On the other hand, in an environment in which the arrangements of the loading line 31 and the unloading tray line 33 in FIG. 3 are switched, an error between the estimated image output from the learning unit 264*a* and the camera image of the camera 8*b* is large, but an error between the estimated image output from the learning unit 264*b* and the camera image of the camera 8*b* is small.

The control amount adjustment unit 266 sets an operation command with respect to the working robot 6 to be an output of the learning unit having the smallest error between the camera image and the estimated image calculated in step S42 between the respective learning units 264*a* and 264*b*, outputs a switching instruction to the output switching unit 268, and ends the series of processing (S43). For example, in the environment illustrated in FIG. 3, the control amount adjustment unit 266 switches a switch of the output switching unit 268 such that the output of the output switching unit 268 becomes an output of the learning unit 264*a*. Further, in the environment where the arrangements of the loading line 31 and the unloading tray line 33 in FIG. 3 are switched, the control amount adjustment unit 266 switches the switch of the output switching unit 268 such that the output of the output switching unit 268 becomes an output of the learning unit 264*b*.

Note that collection of the learning data 252 and machine learning of the learning unit weight data 262 to be applied to the learning unit 264 may be configured to be separately performed based on an environmental condition other than a difference in a position or an orientation of the workpiece 4. For example, it may be configured to adjust the luminance of illumination light of the lighting device 7, collect the learning data 252 in both a bright environment and a dark environment, and use two pieces of the learning unit weight data 262 obtained by machine learning. Further, it may be configured to collect the learning data 252 for each difference in type (color, shape, or the like) of the workpiece 4, and use pieces of the learning unit weight data 262 obtained by machine learning according to the types of the workpiece 4.

Further, an adjustment content of the control amount adjustment unit 266 is not limited to the switching between the learning units 264*a* and 264*b*. For example, the luminance of the illumination light of the lighting device 7 may be adjusted to be changed as illustrated in FIG. 7 together with the switching between the learning units 264*a* and 264*b*. In this manner, it may be configured to select a learning unit with the most matching environmental condition while adjusting an operation command with respect to a peripheral device of the working robot 6.

In this manner, the robot control system 100 includes the plurality of learning units obtained by the machine learning under the plurality of environmental conditions, compares environmental conditions when the respective learning units are subjected to the machine learning with a current environmental condition, and performs control so as to select the learning unit with the most matching environmental condition from among the plurality of learning units. As a result, it is possible to output an operation command of the robot device 1 most suitable for the current environment and/or a setting of an environment sensor can be output, and the robot device 1 can be caused to execute an appropriate operation.

As described above, in the robot control system (the robot control system 100) according to the second embodiment, a control device (the learning type control device 2) includes a plurality of trained models (the learning units 264*a* to 264*b*) that are subjected to machine learning for generation of operation commands of the robot device (the robot device 1) corresponding to outputs of the environment sensor (the camera 8 or a distance measuring device) for different environmental conditions, respectively.

Then, the environmental condition matching degree calculation unit (the environmental condition matching degree calculation unit 265) compares outputs of the plurality of trained models based on an output of the environment sensor at the time of learning with a current output of the environment sensor, and calculates a matching degree between a current environmental condition of the robot device and each of the environmental conditions of the robot device when the plurality of trained models have been subjected to the machine learning.

Further, an adjustment unit (the control amount adjustment unit 266) performs control based on a calculation result of the environmental condition matching degree calculation unit such that an operation command output from a trained model having the highest matching degree of the environmental condition among the plurality of trained models is transmitted to the robot device.

With the robot control system according to the second embodiment configured as described above, the operation of the robot device can be controlled using the operation command generated by the trained model closest to the current environmental condition among the plurality of trained models. Therefore, the robot control system can cause the robot device to appropriately execute the operation using the trained model closest to the current environmental condition. Therefore, the work accuracy of the robot device is improved.

Third Embodiment

As a third embodiment of the present invention, a method of automatically classifying environmental conditions of pieces of newly acquired learning data with respect to a plurality of learning units subjected to machine learning in the past will be described with reference to FIG. 12.

Figure 12:
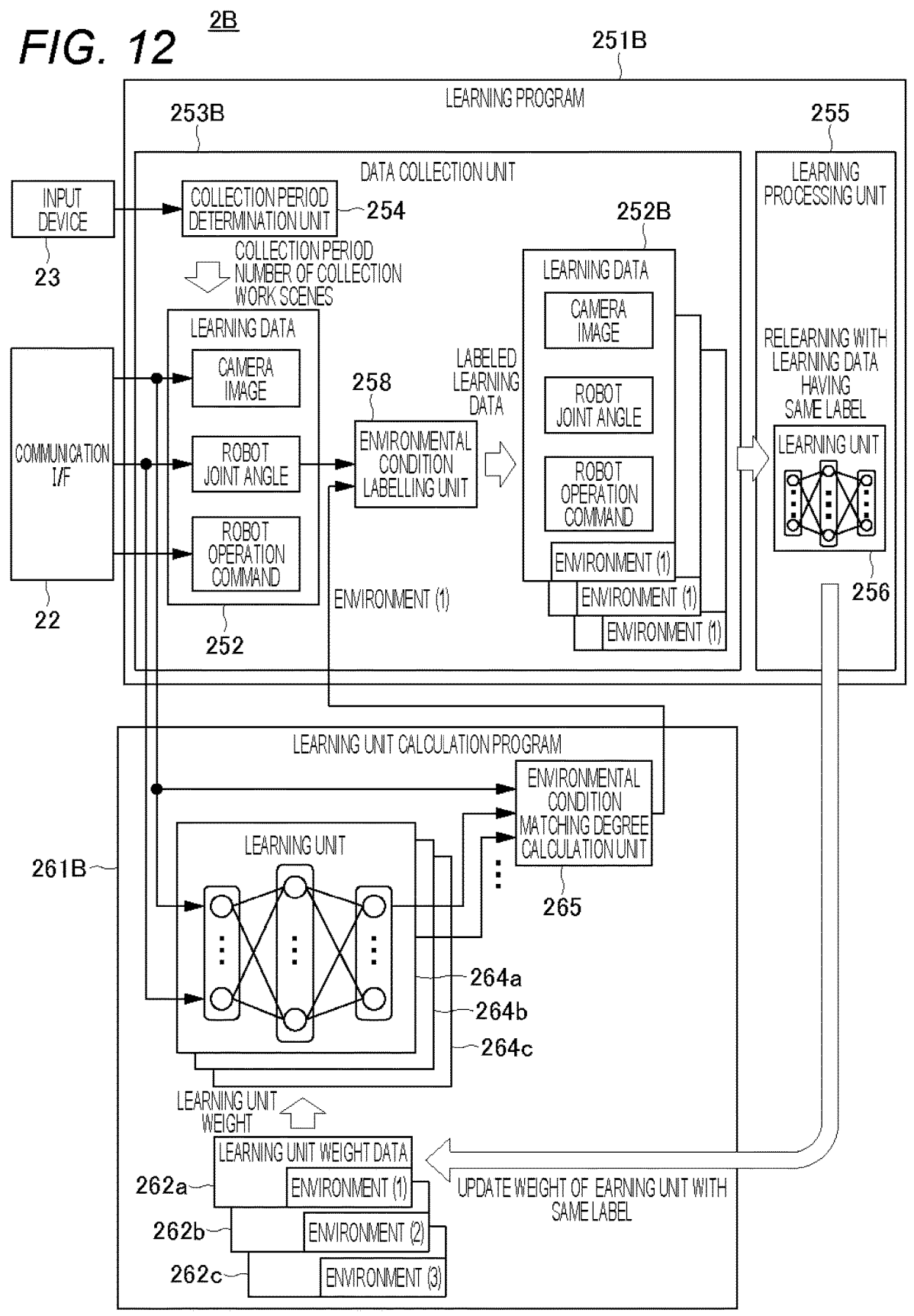
FIG. 12 is a schematic diagram illustrating an example of software configurations of a learning program and a learning unit calculation program executed by a learning type control device in a robot control system according to a third embodiment of the present invention.

FIG. 12 is a schematic diagram illustrating an example of software configurations of a learning program and a learning unit calculation program executed by a learning type control device in a robot control system according to the third embodiment of the present invention. A learning type control device 2B illustrated in FIG. 12 includes a learning program 251B to which an environmental condition labeling unit 258 is added and a learning unit calculation program 261B. The other configurations of the learning type control device 2B can adopt configurations similar to those of the learning type control device 2.

As illustrated in FIG. 12, in the learning unit calculation program 261B, unique information (label) is added in advance to each piece of learning unit weight data 262*a* to 262*c* applied to learning units 264*a* to 264*c*, respectively. For example, the unique information is metadata or the like in which information indicating a unique number of the robot device 1 or an environmental condition is recorded. In FIG. 12, pieces of the unique information are indicated as "Environment (1)" to "Environment (3)". The learning unit weight data 262*a* to 262*c* and the learning units 264*a* to 264*c* will be referred to as the learning unit weight data 262 and the learning unit 264 in the case of not being distinguished from each other. Detailed description will be omitted regarding the control amount adjustment unit 266, the stop command output unit 267, and the output switching unit 268 of the learning unit calculation program 261B.

Then, when the learning program 251B collects the learning data 252, the learning unit calculation program 261B is executed in parallel. The learning unit calculation program 261B calculates each of the learning units 264*a* to 264*c* to which the learning unit weight data 262*a* to 262*c* added with pieces of the unique information are applied, and outputs a plurality of estimated images reproduced by the respective learning units 264*a* to 264*c* to the environmental condition matching degree calculation unit 265.

The environmental condition matching degree calculation unit 265 calculates a matching degree between an environmental condition when each of each of the learning units 264*a* to 264*c* has been subjected to machine learning and an environmental condition of the learning data 252 collected by a data collection unit 253B, and identifies the learning unit weight data 262 with the most matching environmental condition. Then, the environmental condition matching degree calculation unit 265 outputs the unique information of the identified learning unit weight data 262 to the environmental condition labeling unit 258 of the data collection unit 253B. For example, as illustrated in FIG. 12, the environmental condition matching degree calculation unit 265 compares a current camera image with an estimated image of each of three pieces of the learning unit weight data 262*a* to 262*c* respectively added with pieces of the unique information of "Environment (1)" to "Environment (3)". Then, when determining that learning unit weight data corresponding to the estimated image with the most matching environmental condition is the learning unit weight data 262*a*, the environmental condition matching degree calculation unit 265 outputs the unique information "Environment (1)" of the learning unit weight data 262*a*.

When the collected learning data 252 is recorded in the storage device 24, the environmental condition labeling unit 258 of the learning program 251B adds the unique information (label) output by the environmental condition matching degree calculation unit 265 to the learning data 252.

The learning processing unit 255 performs relearning of the learning unit 256 (FIG. 4) using a plurality of pieces of learning data 252B having the same unique information from among newly recorded pieces of the learning data 252, and updates the learning unit weight data 262 corresponding to the unique information. For example, as illustrated in FIG. 12, the learning unit 256 is subjected to machine learning again using the plurality of pieces of learning data 252B added with the unique information of "Environment (1)", and the obtained weight of the learning unit 256 is applied to the learning unit weight data 262*a* added with the unique information of "Environment (1)".

In this manner, it is possible to automatically classify environmental conditions of pieces of the newly acquired learning data 252 with respect to the plurality of learning units 264 subjected to the machine learning in the past, and it is possible to reduce the time and effort required for classification of the environmental conditions.

Further, since the learning unit 256 is subjected to the machine learning again with the added learning data 252 to update the learning unit weight data 262, the inference accuracy of the learning unit 264 is improved, and the robot device 1 can be operated appropriately. Note that the learning data 252 and the learning unit weight data 262 obtained in this manner may be shared with a learning type control device in another site via the network 3.

Initially, a user records unique information of the robot device 1 at the time of performing the machine learning by the learning unit 256 in the storage device 24 in association with the learning unit weight data 262 using the input device 23. Alternatively, the unique information of the robot device 1 may be registered in advance in the learning type control device 2B, and the learning processing unit 255 may record the unique information in the storage device 24 in association with the learning unit weight data 262 created at the time of machine learning using the learning unit 256. When a certain amount of the learning unit weight data 262 is created, the classification of learning data is automated by the method using the unique information of the present embodiment, so that the learning unit weight data 262 can be efficiently updated.

Furthermore, the present invention is not limited to the above-described respective embodiments, and it is a matter of course that various other applications and modifications can be made without departing from a gist of the invention described in the claims.

For example, the above-described respective embodiments describe the detailed and concrete description of the configuration of the robot control system in order to describe the present invention in an easily understandable manner, and are not necessarily limited to one including all the constituent elements that have been described above. Further, a part of a configuration of a certain embodiment can be replaced with a constituent element of another embodiment. Further, a configuration of one embodiment can be also added with a constituent element of another embodiment. Further, addition, substitution, or deletion of other constituent elements can be also made with respect to some configurations of each embodiment.

Further, a part or all of each of the above-described configurations, functions, processing units, and the like may be implemented, for example, by hardware by designing with an integrated circuit and the like. As the hardware, a field programmable gate array (FPGA), an application specific integrated circuit (ASIC), or the like may be used.

REFERENCE SIGNS LIST

1 robot device
2, 2B learning type control device
4 workpiece
5 robot control device
6 working robot (robot body)
7, 7a, 7b lighting device (peripheral device)
8, 8a, 8b camera (peripheral device, environment sensor)
10 robot arm
11 angle meter
12 end effector
13 lighting device moving mechanism (peripheral device)
14 camera moving mechanism (peripheral device)
21 control device
51 control device
100 robot control system
251, 251B learning program
252, 252B learning data
253, 253B data collection unit
254 collection period determination unit
255 learning processing unit
256 learning unit
257 weight update amount calculation unit

258 environmental condition labeling unit
261, 261A, 261B learning unit calculation program
262, 262a to 262b learning unit weight data
263, 263A calculation processing unit
264, 264a to 264b learning unit
265 environmental condition matching degree calculation unit
266 control amount adjustment unit
267 stop command output unit
268 output switching unit
521 control program

The invention claimed is:

1. A robot control system comprising:

a robot device;

an environment sensor configured to acquire an environmental condition of the robot device; and a control device configured to:

input a current output of the environment sensor to a trained model, the trained model being obtained by machine learning, to generate an operation command of the robot device based on the current output of the environment sensor output from the trained model, and control an operation of the robot device, wherein the control device comprises:

a memory storing a program; and a processor which when executing the program configures the processor to:

calculate a matching degree between an environmental condition of the robot device determined when the trained model has machine-learned the operation command of the robot device and a current environmental condition of the robot device based on the current output of the environment sensor; and adjust at least one of a content of the operation command of the robot device and a setting of the environment sensor based on a calculation result of the calculation performed by the processor, wherein the trained model is a trained model obtained by performing machine learning to generate a reproduction signal of the output of the environment sensor in addition to the operation command of the robot device based on the output of the environment sensor, and wherein the processor is further configured to:

generate the operation command of the robot device corresponding to the current output of the environment sensor and the reproduction signal of the output of the environment sensor at a time of the learning when the current output of the environment sensor is input; and calculate a difference between the reproduction signal of the output of the environment sensor at the time of the learning output by the trained model and the current output of the environment sensor as the matching degree between the environmental conditions.

2. The robot control system according to claim 1, wherein the processor is further configured to:

adjust at least one of the content of the operation command of the robot device and the setting of the environment sensor such that the difference between the reproduction signal of the output of the environment sensor at the time of the learning output by the trained model and the current output of the environment sensor is equal to or less than a predetermined value.

3. The robot control system according to claim 2, wherein the robot device includes a robot body and a peripheral device arranged in or around the robot body, the peripheral device is configured to change illuminance inside the robot device or around the robot device, the environment sensor is configured to obtain an image signal of an optical image including a workpiece handled by the robot device, and change brightness or saturation of a captured image based on the image signal or a size of the workpiece appearing in the captured image, and the processor is further configured to:

compare an estimated image, estimated by the trained model from a plurality of the image signals at the time of the learning as the reproduction signal of the output of the environment sensor at the time of the learning with the captured image as the current output of the environment sensor, and calculate a difference in the brightness, the saturation, or the size of the workpiece appearing in the captured image between the estimated image and the captured image; and at least one of a content of an operation command to the peripheral device and the setting of the environment sensor such that the difference in the brightness, the saturation, or the size of the workpiece appearing in the captured image between the estimated image and the captured image is equal to or less than a predetermined value.

4. The robot control system according to claim 2, wherein the robot device includes a robot body and a peripheral device arranged in or around the robot body, the peripheral device is a first moving mechanism that is configured to change a position of a device that changes illuminance inside the robot device or around the robot device, or a second moving mechanism that is configured to change a position of the environment sensor, the environment sensor is configured to obtain an image signal of an optical image including a workpiece handled by the robot device, and the processor is further configured to:

compare an estimated image, estimated by the trained model from a plurality of the image signals at the time of the learning as the reproduction signal of the output of the environment sensor at the time of the learning with a captured image based on the image signal as the current output of the environment sensor, and calculate a difference in brightness or saturation between the estimated image and the captured image or a difference in a positional relationship between the workpiece and the robot device; and adjust a content of an operation command to the peripheral device such that the difference in the brightness or the saturation between the estimated image and the captured image or the difference in the positional relationship between the workpiece and the robot device is equal to or less than a predetermined value.

5. The robot control system according to claim 1, wherein the control device includes a plurality of the trained models, obtained by machine learning for generating a plurality of operation commands of the robot device based on the output of the environment sensor, respectively, for different environmental conditions;

compare outputs of the plurality of trained models based on the output of the environment sensor at the time of the learning with the current output of the environment sensor, and calculate a matching degree between a current environmental condition of the robot device and each of the environmental conditions of the robot device when each of the plurality of trained models has been subjected to the machine learning; and perform control to transmit, to the robot device, the operation command output from a trained model having a highest matching degree of the environmental condition from among the plurality of trained models based on a calculation result calculation performed by the processor.

6. The robot control system according to claim 1, wherein the processor is further configured to compare the output of the environment sensor determined when the trained model has machine-learned the operation command of the robot device with the current output of the environment sensor, and calculate the matching degree between the environmental condition of the robot device at the time of the learning and the current environmental condition of the robot device.

7. A robot control system comprising:

a control device configured to input a current output of an environment sensor, which acquires an environmental condition of a robot device, to a trained model, the trained model being obtained by machine learning, to generate an operation command of the robot device based on the current output of the environment sensor output from the trained model, and control an operation of the robot device, wherein the control device comprises:

a memory storing a program; and a processor which when executing the program configures the processor to:

calculate a matching degree between an environmental condition of the robot device determined when the trained model has machine-learned the operation command of the robot device and a current environmental condition of the robot device based on the current output of the environment sensor; and adjust at least one of a content of the operation command of the robot device and a setting of the environment sensor based on a calculation result of the calculation performed by the processor, wherein the trained model is a trained model obtained by performing machine learning to generate a reproduction signal of the output of the environment sensor in addition to the operation command of the robot device based on the output of the environment sensor, and wherein the processor is further configured to:

generate the operation command of the robot device corresponding to the current output of the environment sensor and the reproduction signal of the output of the environment sensor at a time of the learning when the current output of the environment sensor is input; and calculate a difference between the reproduction signal of the output of the environment sensor at the time of the learning output by the trained model and the current output of the environment sensor as the matching degree between the environmental conditions.

8. A robot control method of a robot control system including a robot device and an environmental sensor, the method comprising the steps of:

acquiring, by the environment sensor, an environmental condition of the robot device;

inputting, by a control device, a current output of the environment sensor to a trained model, the trained model being obtained by machine learning, to generate an operation command of the robot device corresponding to the current output of the environment sensor output from the trained model, and controlling, by the control device, an operation of the robot device;

calculating, by the control device, a matching degree between an environmental condition of the robot device determined based on the trained model having machine-learned the operation command of the robot device and a current environmental condition of the robot device based on the current output of the environment sensor;

adjusting, by the control device, at least one of a content of the operation command of the robot device and a setting of the environment sensor based on a calculation result of the matching degree between the environmental conditions; and causing the robot device to operate, based on at least one of the operation command of the robot device and the setting of the environment sensor adjusted in the adjustment step, wherein the trained model is a trained model obtained by performing machine learning to generate a reproduction signal of the output of the environment sensor in addition to the operation command of the robot device based on the output of the environment sensor, and wherein the method further comprises the steps of:

generating the operation command of the robot device corresponding to the current output of the environment sensor and the reproduction signal of the output of the environment sensor at a time of the learning based on input of the current output of the environment sensor; and calculating a difference between the reproduction signal of the output of the environment sensor at the time of the learning output by the trained model and the current output of the environment sensor as the matching degree between the environmental conditions.

9. A robot control method of a robot control system including a robot device and an environmental sensor, the method comprising the steps of:

acquiring, by the environment sensor, an environmental condition of a robot device;

inputting, by the control device, a current output of the environmental sensor to a trained model, the trained model being obtained by machine learning, to generate an operation command of the robot device corresponding to the current output of the environment sensor output from the trained model, and controlling an operation of the robot device;

calculating, by the control device, a matching degree between an environmental condition of the robot device determined based on the trained model having machine- learned the operation command of the robot device and a current environmental condition of the robot device based on the current output of the environment sensor; and adjusting, by the control device, at least one of a content of the operation command of the robot device and a setting of the environment sensor based on a calculation result of the matching degree between the environmental conditions, wherein the trained model is a trained model obtained by performing machine learning to generate a reproduction signal of the output of the environment sensor in addition to the operation command of the robot device based on the output of the environment sensor, and wherein the method further comprises the steps of:

generating the operation command of the robot device corresponding to the current output of the environment sensor and the reproduction signal of the output of the environment sensor at a time of the learning based on input of the current output of the environment sensor; and calculating a difference between the reproduction signal of the output of the environment sensor at the time of the learning output by the trained model and the current output of the environment sensor as the matching degree between the environmental conditions.

* * * * *